United States Patent
Rule et al.

(10) Patent No.: US 10,903,876 B1
(45) Date of Patent: Jan. 26, 2021

(54) SYSTEM AND METHOD FOR GUIDING CARD POSITIONING USING PHONE SENSORS

(71) Applicant: Capital One Services, LLC, McLean, VA (US)

(72) Inventors: Jeffrey Rule, Chevy Chase, MD (US); Rajko Ilincic, Annandale, VA (US); Colin Hart, Arlington, VA (US); Daniel Herrington, New York, NY (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/653,895

(22) Filed: Oct. 15, 2019

Related U.S. Application Data

(63) Continuation of application No. 16/511,683, filed on Jul. 15, 2019, now Pat. No. 10,498,401.

(51) Int. Cl.
*G06Q 20/32* (2012.01)
*H04B 5/00* (2006.01)
(Continued)

(52) U.S. Cl.
CPC ............. *H04B 5/0056* (2013.01); *G06F 3/14* (2013.01); *G06F 16/583* (2019.01); *G06N 20/00* (2019.01); *G06Q 20/3276* (2013.01); *G06T 7/246* (2017.01); *G06T 7/521* (2017.01); *G06T 7/73* (2017.01); *H04M 1/0264* (2013.01); *G06T 2207/10028* (2013.01);
(Continued)

(58) Field of Classification Search
USPC .......................................................... 348/46
See application file for complete search history.

(56) References Cited

U.S. PATENT DOCUMENTS 10,019,707 B1   7/2018  Sangi et al.
10,430,779 B2 * 10/2019  Iqbal .................. G06Q 20/3221
(Continued)

OTHER PUBLICATIONS

International Search Report and Written Opinion for International Patent Application No. PCT/US2020/041628 dated Sep. 25, 2020, 16 pages.
(Continued)

*Primary Examiner* — Behrooz M Senfi

(57) ABSTRACT

A position alignment system facilitates positioning of a contactless card in a 'sweet spot' in a target volume relative to a contactless card reading device. Alignment logic uses information captured from available imaging devices such as infrared proximity detectors, cameras, infrared sensors, dot projectors, and the like to guide the card to a target location. The captured image information is processed to identify a card position, trajectory and predicted location using one or both of a machine learning model and/or a Simultaneous Localization and Mapping logic. Trajectory adjustment and prompt identification may be intelligently controlled and customized using machine-learning techniques to customize guidance based on the preference and/or historical behavior of the user. As a result, the speed and accuracy of contactless card alignment is improved and received NFC signal strength is maximized, thereby reducing the occurrence of dropped transactions.

20 Claims, 14 Drawing Sheets

(51) Int. Cl.
  *G06N 20/00* (2019.01)
  *G06T 7/73* (2017.01)
  *G06T 7/246* (2017.01)
  *G06F 3/14* (2006.01)
  *H04M 1/02* (2006.01)
  *G06T 7/521* (2017.01)
  *G06F 16/583* (2019.01)
  *H04N 5/247* (2006.01)

(52) U.S. Cl.
  CPC ............... *G06T 2207/10048* (2013.01); *G06T 2207/20081* (2013.01); *G06T 2207/30241* (2013.01); *H04M 2250/04* (2013.01); *H04N 5/247* (2013.01)

(56) References Cited

U.S. PATENT DOCUMENTS

| | | | |
|---|---|---|---|
| 10,498,401 B1 * | 12/2019 | Rule | G06Q 20/352 |
| 10,680,824 B2 * | 6/2020 | Rule | H04L 9/3234 |
| 2020/0184462 A1 * | 6/2020 | Rule | H04L 9/321 |

OTHER PUBLICATIONS

Kundu et al., "Realtime Multibody Visual Slam with a Smoothly Moving Monocular Camera", 2011 IEEE International Conference on Computer Vision, Nov. 6, 2011, pp. 2080-2087.

* cited by examiner

SYSTEM AND METHOD FOR GUIDING CARD POSITIONING USING PHONE SENSORS

RELATED APPLICATIONS

This application is a continuation of U.S. patent application Ser. No. 16/511,683, titled "SYSTEM AND METHOD FOR GUIDING CARD POSITIONING USING PHONE SENSORS" filed on Jul. 15, 2019. The contents of the aforementioned application are incorporated herein by reference.

BACKGROUND

Near-field communication (NFC) includes a set of communication protocols that enable electronic devices, such as a mobile device and a contactless card, to wirelessly communicate information. NFC devices may be used in contactless payment systems, similar to those used by contactless credit cards and electronic ticket smartcards. In addition to payment systems, NFC-enabled devices may act as electronic identity documents and keycards, for example.

A contactless device (e.g., card, tag, transaction card or the like) may use NFC technology for bi-directional or uni-directional contactless short-range communications based on, for example, radio frequency identification (RFID) standards, an EMV standard, or using NFC Data Exchange Format (NDEF) tags, for example. The communication may use magnetic field induction to enable communication between powered electronic devices, including mobile wireless communications devices and unpowered, or passively powered, devices such as a transaction card. In some applications, high-frequency wireless communications technology enables the exchange of data between devices over a short distance, such as only a few centimeters, and two devices may operate most efficiently in certain placement configurations.

While the advantages of using an NFC communication channel for contactless card transactions are many, including simple set up and low complexity, one difficulty faced by NFC data exchanges may be difficulty transmitting a signal between devices with small antennas, including contactless cards. Movement of the contactless card relative to the device during an NFC exchange may undesirably impact the received NFC signal strength at the device and interrupt the exchange. In additions, features of the card, for example metal cards, may cause noise, dampen signal reception, or other reflections that erroneously trigger NFC read transactions. For systems that use contactless cards for authentication and transaction purposes, delays and interruption may result in lost transactions and customer frustration.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

According to one general aspect, a method for guiding positioning of a card to a target position relative to a device includes the steps of: detecting by a proximity sensor that the card is proximate to the device; responsive to the card being proximate to the device, the device capturing a series of images of a three-dimensional volume proximate to the device; processing the series of images to determine a position and a trajectory of the card within the three-dimensional volume proximate to the device; predicting a projected position of the card relative to the device based on the position of the card and the trajectory of the card; identifying one or more variances between the projected position and the target position including identifying at least one trajectory adjustment predicted to reduce the one or more variances and one or more prompts predicted to achieve the trajectory adjustments; displaying the one or more prompts on a display of the device; repeating the steps of capturing the series of images, determining the position and trajectory of the card, predicting the projected position of the card, identifying the one or more variances, the at least one trajectory adjustment and the one or more prompts and displaying the one or more prompts until the one or more variances are within a predetermined threshold; and triggering an event at the device to retrieve data from the card in response to the one or more variances being within the predetermined threshold. Other embodiments of this aspect include corresponding computer systems, apparatus, and computer programs recorded on one or more computer storage devices, each configured to perform the actions of the methods.

Implementations may include one or more of the following features. The method where the step of processing the series of images to determine the position and a trajectory of the card within the three-dimensional volume proximate to the device uses at least one of a machine learning model or a simultaneous localization and mapping (slam) process. The method including the steps of, during the event, repeating the steps of capturing the series of images, determining the position and the trajectory of the card, predicting the projected position of the card, identifying the one or more variances, the at least one trajectory adjustment and the one or more prompts and displaying the one or more prompts to ensure that the variances remain within a predetermined threshold to enable the device to read data from the card. The method where the step of triggering the event includes initiating a data exchange between the card and the device, where the data exchange is related to at least one of a financial transaction and an authorization transaction. The method where the step of capturing the series of images is performed by one or more of a camera of the device, an infrared sensor of the device or a dot projector of the device, and where the series of images includes one or both of two-dimensional image information and three-dimensional image information related to one or more of an infrared energy and a visible light energy measured at the device. The method including the step of generating a volume map of the three-dimensional volume proximate to the device using the series of images obtained from one or more of the camera, the infrared sensor and the dot projector, the volume map including a pixel data for a plurality of pixel locations within the three-dimensional volume proximate to the device. The method where the step of processing the series of images to determine the position and the trajectory of the card includes the step of forwarding the series of images to a feature extraction machine learning model trained to process the volume map to detect one or more features of the card and to identify the position and the trajectory of the card within the volume map in response to the one or more features. The method where the step of predicting the projected position of the card relative to the device includes forwarding the position and the trajectory of the card to a second machine learning model trained to predict the projected position based on a historic attempt to position the card. The method where the historic attempt used to train the second machine learning model is customized to a user of the device. The method where the one or more prompts include at least one of a visible prompt, an audible prompt, or a combination of visible and audible prompts. Implementations of the described techniques may include hardware, a method or process, or computer software on a computer-accessible medium.

According to one general aspect, a device includes a proximity sensor configured to detect whether a card is proximate to the device; an image capture device coupled to the proximity sensor and configured to capture a series of images of a three-dimensional volume proximate to the device; a processor coupled to the proximity sensor and the image capture device; a display interface coupled to the processor; a card reader interface coupled to the processor; and a non-transitory medium storing alignment program code configured to guide a card to a target position relative to the device. The alignment program code operable when executed upon by the processor to: monitor a proximity of the card to the device; enable the image capture device to capture the series of images of the three-dimensional volume proximate to the device; process the series of images to determine a position and a trajectory of the card within the three-dimensional volume proximate to the device and to predict a projected position of the card relative to the device based on the position of the card and the trajectory of the card; identify one or more variances between the projected position and the target position including identifying at least one trajectory adjustment and one or more prompts to achieve the at least one trajectory adjustment, the at least one trajectory adjustment predicted to reduce the one or more variances; display the one or more prompts on the display interface during at least one of prior to and during the card read operation; and trigger a card read operation by the card reader interface when the one or more variances are within a predetermined threshold. Other embodiments of this aspect include corresponding computer systems, apparatus, and computer programs recorded on one or more computer storage devices, each configured to perform the actions of the methods.

Implementations may include one or more of the following features. The device off claim 11 where the program code that is operable when executed upon to process the series of images to determine the position and a trajectory of the card within the three-dimensional volume proximate to the device uses at least one of a machine learning model or a simultaneous localization and mapping (slam) process. The device where the card read operation is associated with one of a financial transaction and an authorization transaction. The device where the image capture device includes one or more of a camera, an infrared sensor or a dot projector, and the series of images capture one or more of an infrared energy and a visible light energy measured at the device. The device where the series of images include one or both of two-dimensional image information and three-dimensional image information. The device where the alignment program code is further configured to generate a volume map of the three-dimensional volume proximate to the device using the series of images, the infrared sensor and the dot projector, the volume map including pixel data for a plurality of pixel locations within the three-dimensional volume proximate to the device. The device further including a feature extraction machine learning model is trained to locate the card within the three-dimensional volume proximate to the device and to predict a projected position using a historic attempt to position the card. The device where the historic attempt is a user specific historic attempts. The device where the one or more prompts include at least one of a visible prompt, an audible prompt, or a combination of visible and audible prompts. Implementations of the described techniques may include hardware, a method or process, or computer software on a computer-accessible medium.

According to one general aspect, a method for guiding a card to a target position relative to a device includes the steps of: detecting a request by the device to perform a transaction; measuring, using a proximity sensor of the device, a proximity of the card to the device; controlling at least one of a camera and an infrared depth sensor of the device to capture a series of images of a three-dimensional volume proximate to the device when the card is determined to be proximate to the device; processing the series of images to determine a position and trajectory of the card in the three-dimensional volume proximate to the device, the processing performed by at least one of a machine learning model trained using historic attempts to guide the card to the target position or a simultaneous localization and mapping (slam) process; predicting a projected position of the card relative to the device based on the position and the trajectory of the card; identifying one or more variances between the projected position and the target position including identifying at least one trajectory adjustment selected to reduce the one or more variances and identifying one or more prompts to achieve the trajectory adjustments; displaying the one or more prompts on a display of the device; repeating the steps of capturing image information, determining the position and trajectory of the card, predicting the projected position of the card, identifying the one or more variances, the at least one trajectory adjustment and the one or more prompts and displaying the one or more prompts until the one or more variances are within a predetermined threshold; and triggering a read of the card by a card reader of the device when the variances are less than the predetermined threshold. Other embodiments of this aspect include corresponding computer systems, apparatus, and computer programs recorded on one or more computer storage devices, each configured to perform the actions of the methods.

DETAILED DESCRIPTION

Figure 1B:
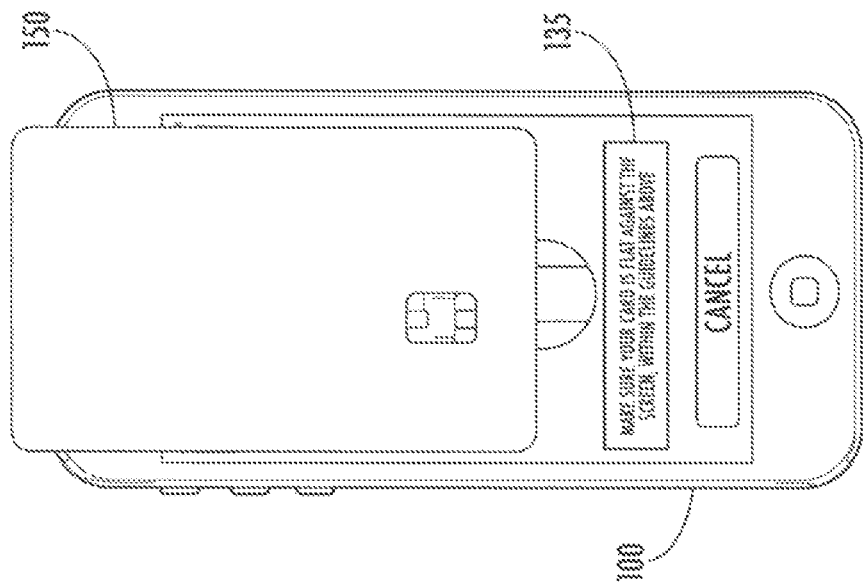
FIGS. 1A and 1B are diagrams provided to illustrate an interaction between a contactless card and a contactless card reading device.

A position alignment system and method disclosed herein facilitates positioning of a contactless card relative to the device, for example positioning the contactless card proximate to a target position within a three-dimensional target volume. In one embodiment, the position alignment system uses a proximity sensor of the device to detect a contactless card's approach. Upon detection of the approach, a series of images may be captured by one or more imaging elements of the device, for example including by a camera of the device and/or by an infrared sensor/dot projector of the device. The series of images may be processed to determine a position and trajectory of the card relative to the device. The position and trajectory information may be processed by a predictive model to identify a trajectory adjustment to reach the target position and one or more prompts to achieve the trajectory adjustment. Such an arrangement provides real-time positioning assist feedback to a user using existing imaging capabilities of mobile devices, thereby improving the speed and accuracy of contactless card alignment and maximizing received NFC signal strength.

According to one aspect, a triggering system may automatically initiate a near field communication between the device and the card to communicate a cryptogram from an applet of the card to the device. The triggering system may operate in response to a darkness level or change in darkness levels in the series of images captured by the device. The triggering system may operate in response to a complexity level or change in complexity level in the series of images. The triggering system may automatically trigger an operation controlled by a user interface of the device, for example automatically triggering a read of the card. The triggering system may be used alone or with assist of one or more aspects of the position alignment system disclosed herein.

These and other features of the invention will now be described with reference to the figures, wherein like reference numerals are used to refer to like elements throughout. With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. Processes may be implemented in hardware, software, or a combination thereof. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose, or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

In the following description, for purposes of explanation, numerous specific details are set forth in order to provide a thorough understanding thereof. It may be evident, however, that the novel embodiments may be practiced without these specific details. In other instances, well-known structures and devices are shown in block diagram form to facilitate a description thereof. The intention is to cover all modifications, equivalents, and alternatives consistent with the claimed subject matter.

Figure 1A:
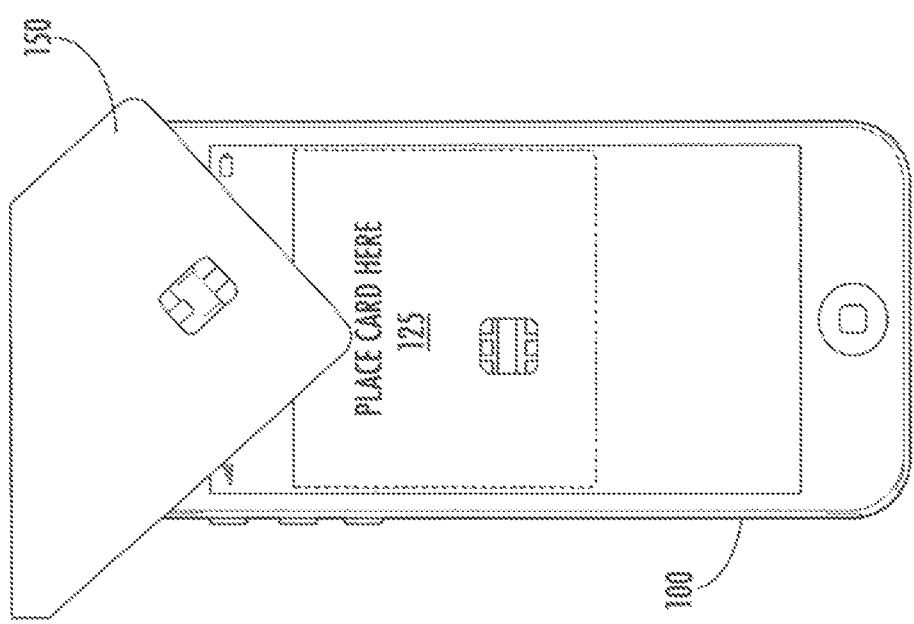

FIGS. 1A and 1B each illustrate a mobile phone device 100 and a contactless card 150. A contactless card 150 may comprise a payment or transaction card (hereinafter a transaction card), such as a credit card, debit card, or gift card, issued by a service provider. In some examples, the contactless card 150 is not related to a transaction card, and may comprise, without limitation, an identification card or passport. In some examples, the transaction card may comprise a dual interface contactless transaction card. The contactless card 150 may comprise a substrate including a single layer, or one or more laminated layers composed of plastics, metals, and other materials.

In some examples, the contactless card 150 may have physical characteristics compliant with the ID-1 format of the ISO/IEC 7810 standard, and the contactless card may otherwise be compliant with the ISO/IEC 14443 standard. However, it is understood that the contactless card 150 according to the present disclosure may have different characteristics, and the present disclosure does not require a contactless card to be implemented in a transaction card.

In some embodiments, contactless cards may include an embedded integrated circuit device that can store, process, and communicate data with another device, such as a terminal or mobile device, via NFC. Commonplace uses of contactless cards include transit tickets, bank cards, and passports. Contactless card standards cover a variety of types as embodied in ISO/IEC 10536 (close-coupled cards), ISO/IEC 14443 (proximity cards) and ISO/IEC 15693 (vicinity cards), each of the standards incorporated by reference herein. Such contactless cards are intended for operation when very near, nearby and at a longer distance from associated coupling devices, respectively.

An exemplary proximity contactless card and communication protocol that may benefit from the positioning assist system and method disclosed herein includes that described in U.S. patent application Ser. No. 16/205,119 filed Nov. 29, 2018, by Osborn, et. al, entitled "Systems and Methods for Cryptographic Authentication of Contactless Cards" and incorporated herein by reference (hereinafter the '119 Application).

In one embodiment, the contactless card comprises NFC interface comprised of hardware and/or software configured for bi-directional or uni-directional contactless short-range communications based on, for example, radio frequency identification (RFID) standards, an EMV standard, or using NDEF tags. The communication may use magnetic field induction to enable communication between electronic devices, including mobile wireless communications devices. Short-range high-frequency wireless communications technology enables the exchange of data between devices over a short distance, such as only a few centimeters.

NFC employs electromagnetic induction between two loop antennas when NFC-enabled devices exchange information. ISO/IEC 14443-2:2016 (incorporated herein by reference) specifies the characteristics for power and bi-directional communication between proximity coupling devices (PCDs) and proximity cards or objects (PICCs). The PCD produces a high frequency alternating magnetic field. This field inductively couples to the PICC to transfer power and is modulated for communication, operating within the radio frequency ISM band of 13.56 MHz on ISO/IEC 18000-3 air interface at rates ranging from 106 to 424 kbit/s. As specified by the ISO standard, a PCD transmission generates a homogeneous field strength ("H") varying from at least Hmin of 1.5 A/m (rms) to Hmax of 7.5 A/m (rms) to support Class 1, Class 2 and/or Class 3 antenna designs of PICC devices.

In FIGS. 1A and 1B, mobile phone 100 is a PCD device, and contactless card 150 is a PICC device. During a typical contactless card communication exchange, as shown in FIG. 1A a user may be prompted by the mobile phone 100 to engage the card with the mobile device, for example by including a prompt 125 indicating a card placement location on display 130. For the purposes of this application, 'engaging' the card with the device includes, but is not limited to, bringing the card into a spatial operating volume of the NFC reading device (i.e., mobile phone 100), wherein the operating volume of the NFC reading device includes the spatial volume proximate to, adjacent to and/or around the NFC reading device wherein the homogeneous field strength of signals transmitted by and between the mobile device 100 and card 150 are sufficient to support data exchange. In other words, a user may engage a contactless card with a mobile device by tapping the card to the front of the device or holding the card within a distance from the front of the device that allows for NFC communication. In FIG. 1A, the prompt 125 provided on display 130 is provided to achieve this result. FIG. 1B illustrates the card disposed within the operating volume for a transaction. Reminder prompts, such as prompt 135, may be displayed to the user during a transaction as shown in FIG. 1B.

An exemplary exchange between the phone 100 and the card 150 may include activation of the card 150 by an RF operating field of the phone 100, transmission of a command by the phone 100 to the card 150 and transmission of a response by the card 150 to the phone 100. Some transactions may use several such exchanges and some transactions may be performed using a single read operation of a transaction card by a mobile device.

In an example, it may be appreciated that successful data transmission may be best achieved by maintaining magnetic field coupling throughout the transaction to a degree at least equal to the minimum (1.5 A/m (rms)) magnetic field strength, and that magnetic field coupling is a function of signal strength and distance between the card 150 and the mobile phone 100. When testing compliance of NFC enabled devices, for example, to determine whether the power requirements (determining operating volume), transmission requirements, receiver requirements, and signal forms (time/frequency/modulation characteristics) of the devices meet the ISO standards, a series of test transmissions are made at test points within an operating volume defined by the NFC forum analog specification.

Figure 2:
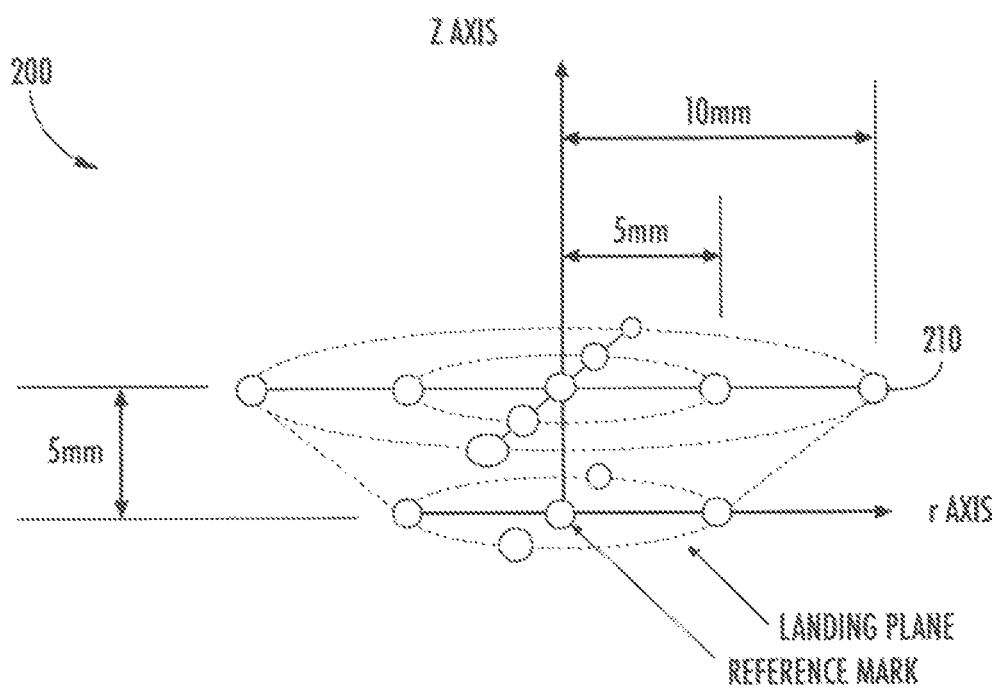
FIG. 2 is an illustration of an exemplary operating volume of a Near Field Communication device.

FIG. 2 illustrates an exemplary operating volume 200 identified by the NFC analog forum for use in testing NFC enabled devices. The operating volume 200 defines a three-dimensional volume disposed about the contactless card reader device (e.g. a mobile phone device) and may represent a preferred distance for a near field communication exchange, for example for an NFC read of the card by the device. To test NFC devices, received signals may be measured at various test points, such as point 210, to validate that the homogeneous field strength is within the minimum and maximum range for the NFC antenna class.

Although the NFC standard dictates particular operating volumes and testing methods, it will be readily appreciated that the principles described herein are not limited to operating volumes having particular dimensions, and the method does not require that operating volumes be determined based upon signal strengths of any particular protocol. Design considerations, including but not limited to the power of a PCD device, the type of PICC device, the intended communication between the PCD and PICC device, the duration of communication between the PCD and PICC device, the imaging capabilities of the PCD device, the anticipated operating environment of the devices, historical behavior of the user of the devices, etc., may be used to determine the operating volume used herein. As such, any discussions below refer to a 'target volume' that may comprise, in various embodiments, the operating volume or a subset of the operating volume.

While in FIGS. 1A and 1B the placement of the card 150 on the phone 100 may appear straightforward, typically the sole feedback provided to a user when card alignment is suboptimal is a transaction failure. Contactless card EMV transactions may comprise a series of data exchanges requiring connectivity for up to two seconds. During such a transaction, a user juggling the card, the NFC reading device, and any merchandise may have difficulty locating and maintaining the target position of the card relative to the phone to maintain the preferred distance for a successful NFC exchange.

According to one aspect, to overcome these issues a card alignment system and method activates imaging components of a mobile device to capture a series of images. The series of images may be used to locate the position and trajectory of the card in real-time to guide the card to the preferred distance and/or target location for an NFC exchange. The series of images may also be used to automatically trigger an NFC exchange or operation, for example by measuring a darkness level and/or complexity level, or patterns thereof, in the series of captured images.

For example, using this information, the alignment method may determine trajectory adjustments and identify prompts associated with the trajectory adjustments for directing the card to the target volume. The trajectory adjustment prompts may be presented to the user using audio and/or display components of the phone to guide the card to a target location within the target volume and/or to initiate an NFC read. In various embodiments, a 'target location' (or 'target position') may be defined at various granularities. For example, a target location may comprise the entire target volume or a subset of the target volume. Alternatively, a target location may be associated with a specific position of the contactless card within the target volume, and/or a space surrounding and including the specific position.

Figure 3:
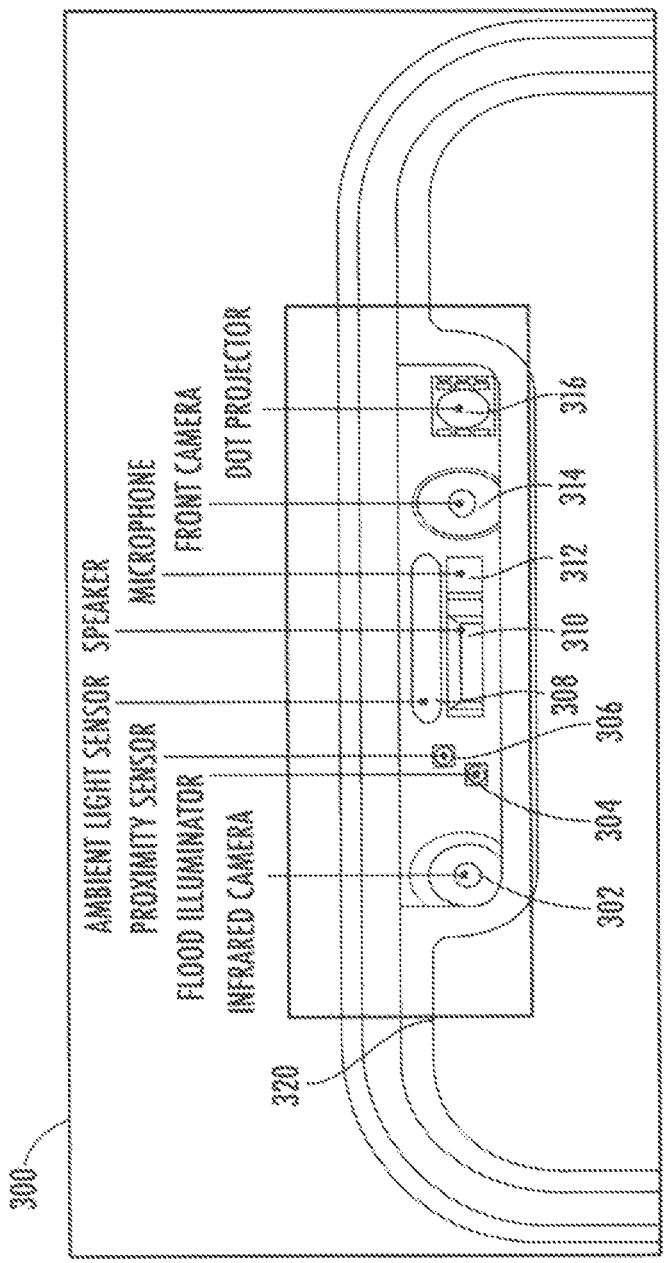
FIG. 3 is a view of a sensor bar of a mobile phone that may be configured to perform position alignment as disclosed herein.

FIG. 3 is a front facing top portion 300 of one embodiment of a mobile phone that may be configured to support the alignment system and method disclosed herein. The phone is shown to include a sensor panel 320 disposed along the top edge of portion 300, although it is appreciated that many devices may include fewer or more sensors that may be positioned differently on their devices, and the invention is not limited to any particular type, number, arrangement, position, or design of sensors. For example, most phones have front facing and rear facing cameras and/or other sensors, any of which may be used for purposes described herein for position alignment guidance.

Sensor panel 320 is shown to include an infrared camera 302, a flood illuminator 304, a proximity sensor 306, an ambient light sensor 308, a speaker 310, a microphone 312, a front camera 314 and a dot projector 316.

Infrared camera 302 may be used together with the dot projector 316 for depth imaging. An infrared emitter of the dot projector 316 may project up to 30,000 dots in a known pattern onto an object, such as a user's face. The dots are photographed by dedicated infrared camera 302 for depth analysis. Flood illuminator 304 is a light source. Proximity sensor 306 is a sensor able to detect the presence of nearby objects without any physical contact.

Proximity sensors are commonly used on mobile devices and operate to lock UI input, for example, to detect (and skip) accidental touchscreen taps when mobile phones are held to the ear. An exemplary proximity sensor operates by emitting an electromagnetic field or a beam of electromagnetic radiation (infrared, for instance) at a target, and measuring the reflected signal received from the target. The design of a proximity sensor may vary depending upon a target's composition; capacitive proximity sensors or photoelectric sensors may be used to detect a plastic target, and inductive proximity sensor may be used to detect a metal target. It is appreciated that other methods of determining proximity are within the scope of this disclosure, and the present disclosure is not limited to a proximity sensor that operates by emitting an electromagnetic field.

The top portion 300 of the phone also is shown to include an ambient light sensor 308 used, for example, to control the brightness of a display of the phone. Speaker 310 and microphone 312 enable basic phone functionality. Front camera 314 may be used for two dimensional and/or three-dimensional image capture as described in more detail below.

Figure 4:
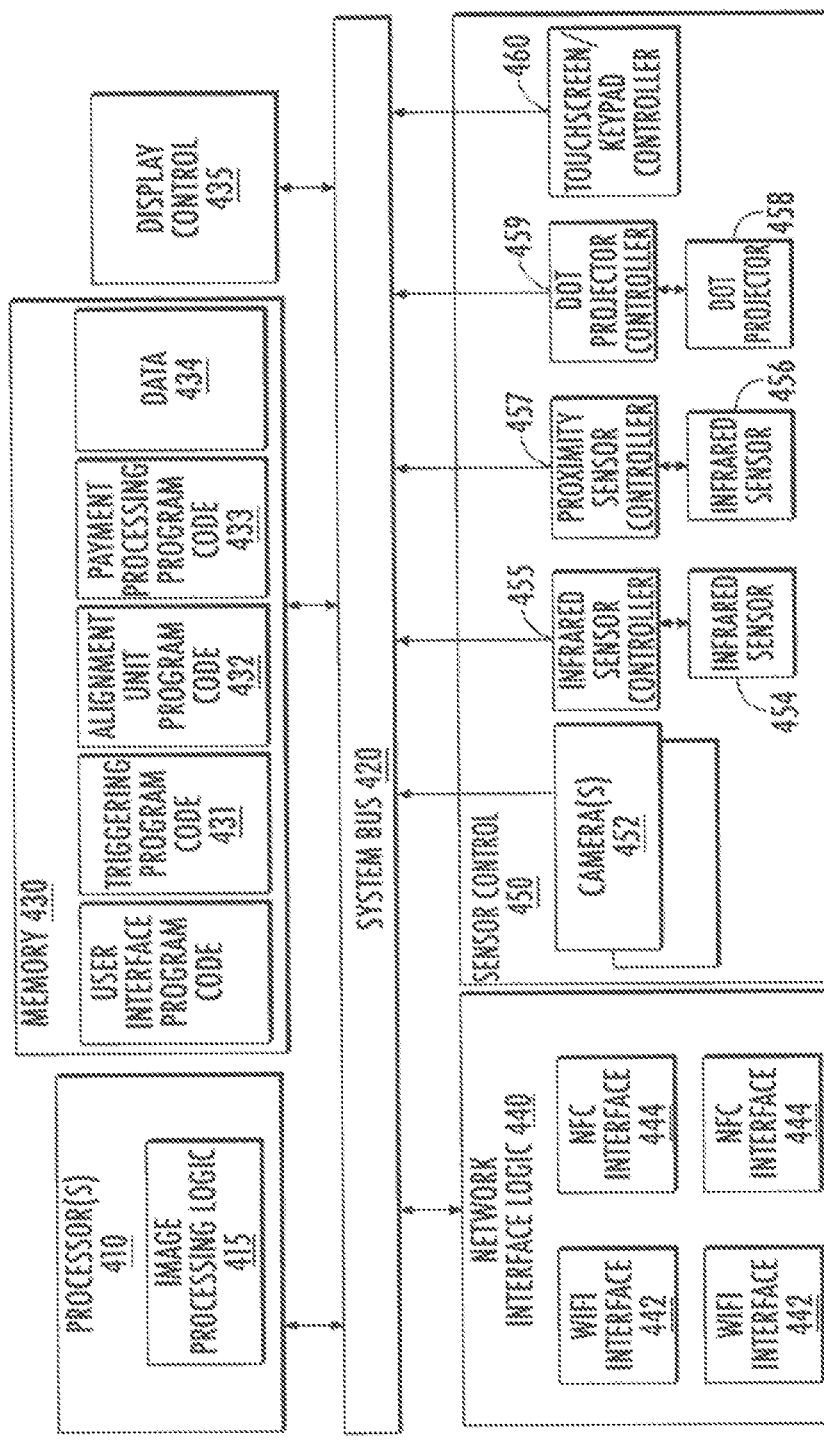
FIG. 4 is a block diagram illustrating exemplary components of one embodiment of a device configured as disclosed herein.

FIG. 4 is a block diagram of representative components of a mobile phone or other NFC capable device incorporating elements facilitating card position alignment as disclosed herein. The components include interface logic 440, one or more processors 410, a memory 430, display control 435, network interface logic 440 and sensor control 450 coupled via system bus 420.

Each of the components performs particular functions using hardware, software or a combination thereof. Processor(s) 410 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, processes, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Image processor 415 may be a any processor or alternatively may be a specialized digital signal processor (DSP) used for image processing of data received from the camera (s) 452, infrared sensor controller 455, proximity sensor controller 457 and dot projector controller 459. The image processor 415 may employ parallel computing even with SIMD (Single Instruction Multiple Data) or MIMD (Multiple Instruction Multiple Data) technologies to increase speed and efficiency. In some embodiments, the image processor may comprise a system on a chip with multi-core processor architecture enabling high speed, real-time image processing capabilities.

Memory 430 may comprise a computer-readable storage medium to store program code (such as alignment unit program code 432 and payment processing program code 433) and data 434. Memory 430 may also store user interface program code 436. The user interface program code 436 may be configured to interpret user input received at user interface elements including physical elements such as keyboards and touchscreens 460. The user interface program code 436 may also interpret user input received from graphical user interface elements such as buttons, menus, icons, tabs, windows, widgets etc. that may be displayed on a user display under control of display control 435. According to one aspect, and as described in more detail below, memory 430 may also store triggering program code 431. Triggering program code 431 may be used to automatically trigger NFC communications between the device and a card, for example in response to determined darkness levels and/or complexity levels of a series of images captured by cameras 452 or other sensor devices. In some embodiments, operations that are automatically triggered may be those generally performed as a response to user input, for example automatically triggering a read operation that is generally initiated by activation of a user interface element such as a read button provided on a graphic user interface. Automatic triggering reduces delays and inaccuracies associated with using user interface elements to control NFC communications.

Examples of a computer-readable storage medium may include any tangible media capable of storing electronic data, including volatile memory or non-volatile memory, removable or non-removable memory, erasable or non-erasable memory, writeable or re-writeable memory, and so forth. Program code may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

Alignment unit program code 432 comprises program code as disclosed herein for positioning assist for contactless card/phone communications. The alignment unit program code 432 may be used by any service provided by the phone that uses contactless card exchanges for authentication or other purposes. For example, services such as payment processing services, embodied in payment processing program code 433 may use contactless card exchanges for authentication during initial stages of a financial transaction.

The system bus 420 provides an interface for system components including, but not limited to, the memory 430 and to the processors 410. The system bus 420 may be any of several types of bus structure that may further interconnect to a memory bus (with or without a memory controller), a peripheral bus, and a local bus using any of a variety of commercially available bus architectures.

Network Interface logic includes transmitters, receivers, and controllers configured to support various known protocols associated with different forms of network communications. Example network interfaces that may be included in a mobile phone implementing the methods disclosed herein include, but are not limited to a WIFI interface 442, an NFC interface 444, a Bluetooth Interface 446 and a Cellular Interface 448.

Sensor control 450 comprises a subset of sensors that may support the position alignment methods disclosed herein, including camera(s) 452 (which may include camera technology for capturing two dimensional and three dimensional light based or infrared images) an infrared sensor 454 and associated infrared sensor controller 455, a proximity sensor 456 and associated proximity sensor controller 457 and a dot projector 458 and associated dot projector controller 459.

Figure 5:
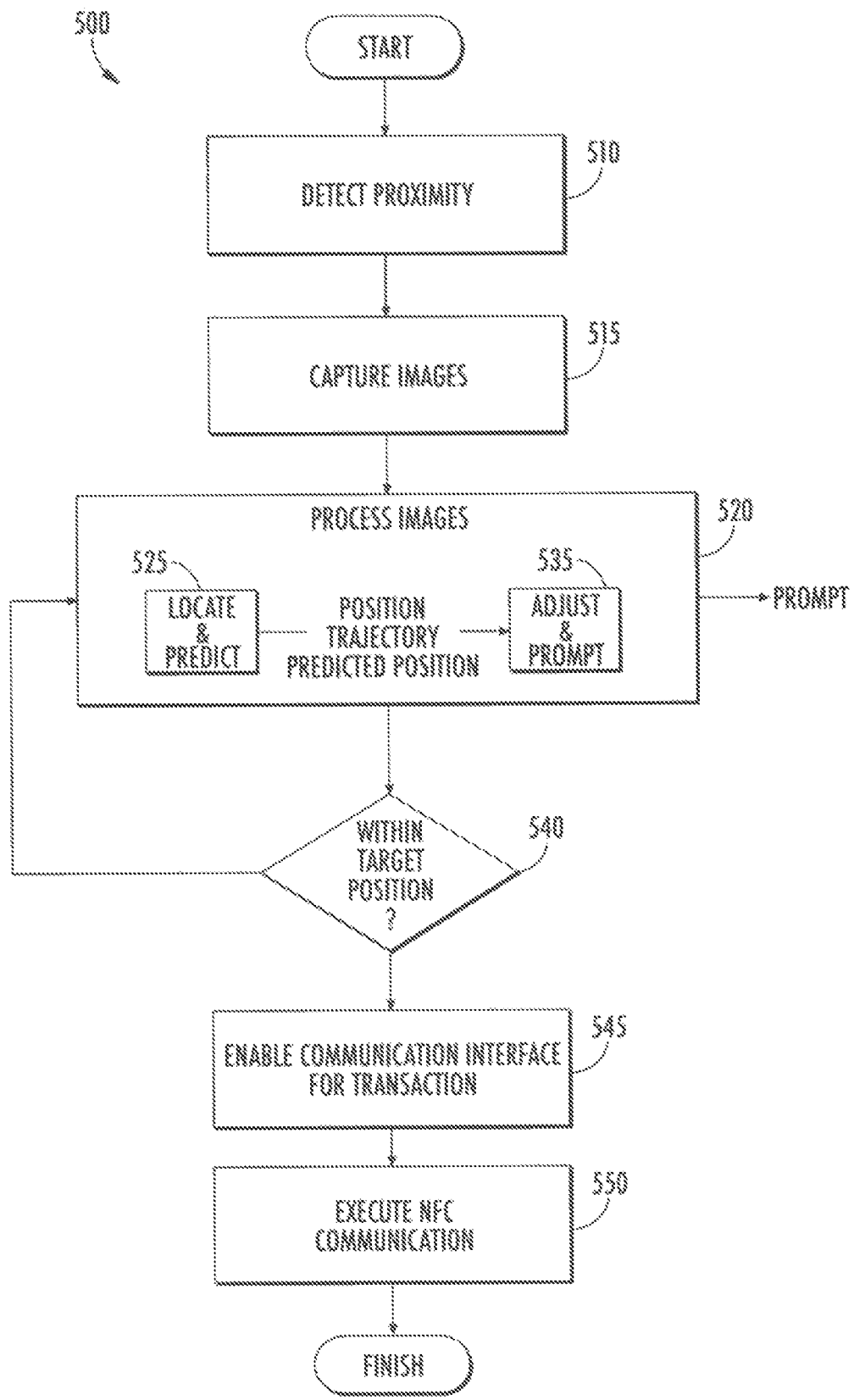
FIG. 5 is a flow diagram of exemplary steps of a position alignment system and method that may be performed by the NFC transaction device of FIG. 4.

Referring now to FIG. 5, a flow diagram is shown of an exemplary process 500 for contactless card positioning using image information obtained in real-time from sensors of the NFC reading device. The process includes detecting contactless card proximity at step 510 and, upon detection, triggering image capture at step 515 using imaging capabilities of the device and processing the captured series of images at step 520. Processing the images may be performed at least in part by alignment unit program code and may include locating the contactless card within a target volume proximate to the device and determining the trajectory of the card at step 525. Processing the images may also include, at step 535, predicting a trajectory adjustment for aligning the card with a target position within the target volume, identifying a prompt for achieving the trajectory adjustment and displaying the prompt on the device. The prompt may include one or more of instructions (in text or symbol form), images, including one or more of the captured images, colors, color patterns, sounds and other mechanisms.

The process of capturing images at 515 and processing images at 520 continues until it is determined that the contactless card is in its target position (and/or a preferred distance from the device) at step 540. The alignment process may then initiate, or cause to be initiated, the data exchange transaction/communication between the card and the device at step 545. For example, the alignment process may perform one or more of providing a display prompt to a user to cause the user to initiate the transaction. Alternatively, the alignment process may automatically initiate the data exchange process when alignment is detected at step 540. In embodiments which use NFC interface technology, the alignment process may turn on the NFC interface to enable the NFC communication, and at step 550 the NFC communication is executed.

Figure 6:
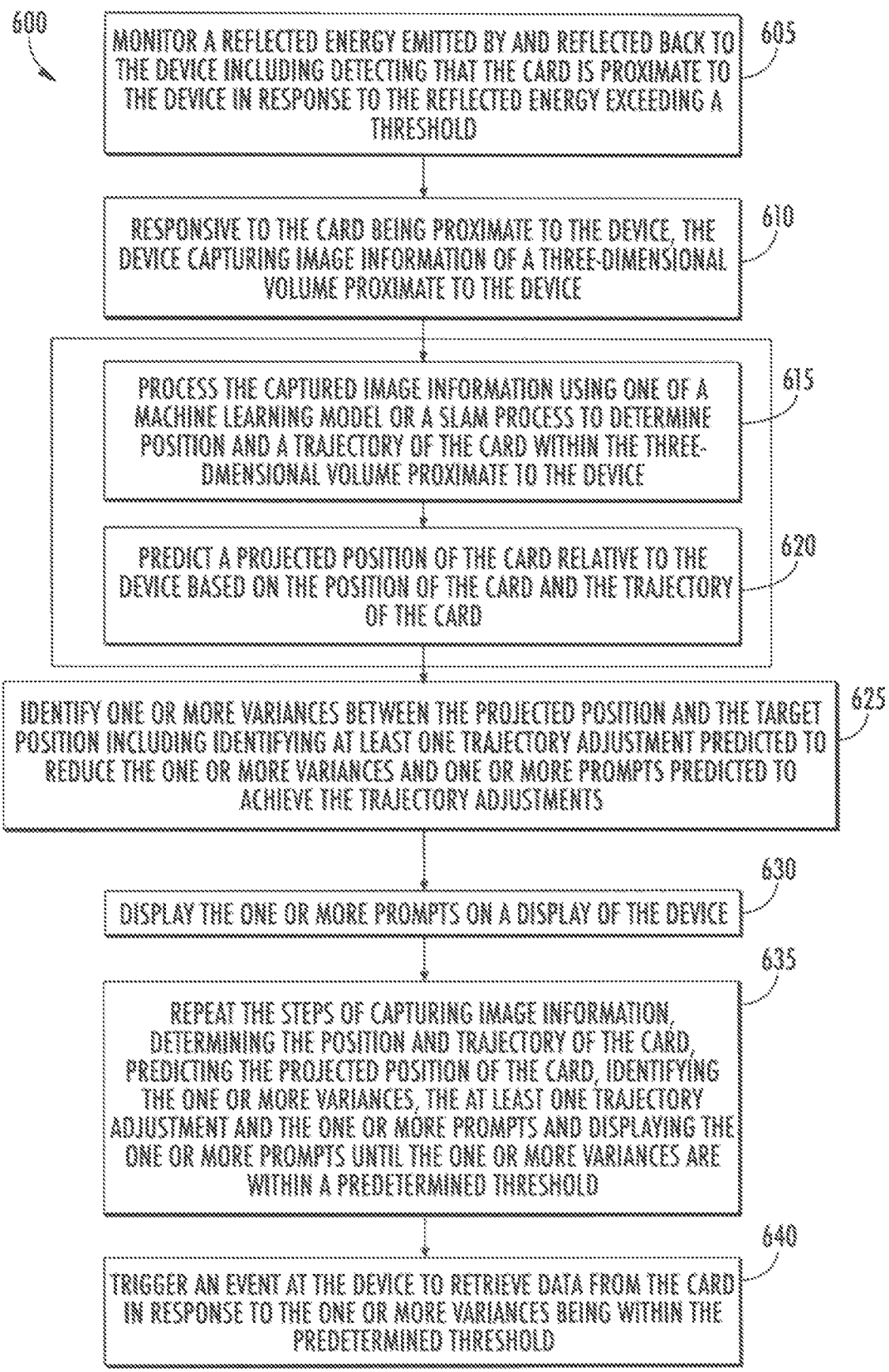
FIG. 6 is a detailed flow diagram illustrating exemplary steps that may be performed to align a position of the contactless card relative to the device.

FIG. 6 is a flow diagram of a first exemplary embodiment of a position alignment process 600 that processes captured images using machine-learning predictive models to extract features, locate the card in a three-dimensional target volume, and to determine a card trajectory. The system may also use machine-learning predictive models to identify trajectory adjustments to move the card to a target position within the target volume and to identify prompts to achieve the trajectory adjustment.

At step 605, a phone monitors reflected energy emitted by and reflected back to the device, including detecting that the card is proximate to the device when the reflected energy exceeds a threshold by a proximity sensor. In some phones, the proximity sensor may be implemented using a light sensor chip. Common light sensor chips include the ISL29003/23 & GP2A by Intersil & Sharp respectively. Both these sensor-chips are primarily active light sensors, which provide the ambient light intensity in LUX units. Such sensors are implemented as Boolean sensors. Boolean sensors return two values, "NEAR" & "FAR." Thresholding is based on the LUX value, i.e. the LUX value of the light sensor is compared with a threshold. A LUX-value more than threshold means the proximity sensor returns "FAR." Anything less than the threshold value and the sensor returns "NEAR." The actual value of the threshold is custom-defined depending on the sensor-chip in use and its light-response, the location & orientation of the chip on the smart-phone body, the composition and reflective response of the target contactless card, etc.

At step 610, responsive to the card being proximate to the device, the device initiates image capture. Image capture may include capturing two-dimensional images using one or more of the cameras accessible on the device. The two-dimensional images may be captured by one or both of visible light and infrared cameras. For example, some mobile devices may include a rear-facing camera capable of shooting high-dynamic range (HDR) photos.

Certain mobile devices may include dual cameras which capture images along different imaging planes to create a depth-of-field effect. Some may further include a "selfie" infrared camera or may include an infrared emitter technology, for example for projecting a dots matrix of infrared light in a known pattern onto a target. Those dots may then be photographed by the infrared camera for analysis.

The captured images from any one or more of the above sources, and/or subsets of or various combinations of the captured images, may then be forwarded to steps 615 and 620 for image processing and contactless card localization, including determining a position and trajectory of the contactless card.

According to one aspect, image processing includes building a volume map of a target volume proximate to the phone, including an area proximate to and/or including at least a portion of an operating volume of an NFC interface of the phone, wherein a volume map is represented as a three-dimensional array of voxels storing values related to color and/or intensity of the voxel within a visible or infrared spectrum. In some embodiments, a voxel is a discrete element in an array of elements of volume that constitute a notional three-dimensional space, for example each of an array of discrete elements into which a representation of a three-dimensional object is divided.

According to one aspect, position alignment includes processing the voxels of the target volume to extract features of the contactless card to determine a position of the card within the target volume and comparing voxels of target volumes constructed at different points in time to track the movement of the card over time to determine a card trajectory. Various processes may be used to track position and trajectory, including using machine learning models and alternatively using SLAM techniques, each now described in more detail below.

Machine learning is a branch of artificial intelligence that relates to mathematical models that can learn from, categorize, and make predictions about data. Such mathematical models, which may be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that may be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models may be constructed through an at least partially automated (e.g., with little or no human involvement) process called training. During training, input data may be iteratively supplied to a machine-learning model to enable the machine-learning model to identify patterns related to the input data or to identify relationships between the input data and output data. With training, the machine-learning model may be transformed from an untrained state to a trained state. Input data may be split into one or more training sets and one or more validation sets, and the training process may be repeated multiple times. The splitting may follow a k-fold cross-validation rule, a leave-one-out-rule, a leave-p-out rule, or a holdout rule.

According to one embodiment, a machine learning model may be trained to identify features of a contactless card as it approaches an NFC reading device using image information captured by one or more imaging elements of the device, and the feature information may be used to identify a position and trajectory of the card within the target volume.

Figure 7:
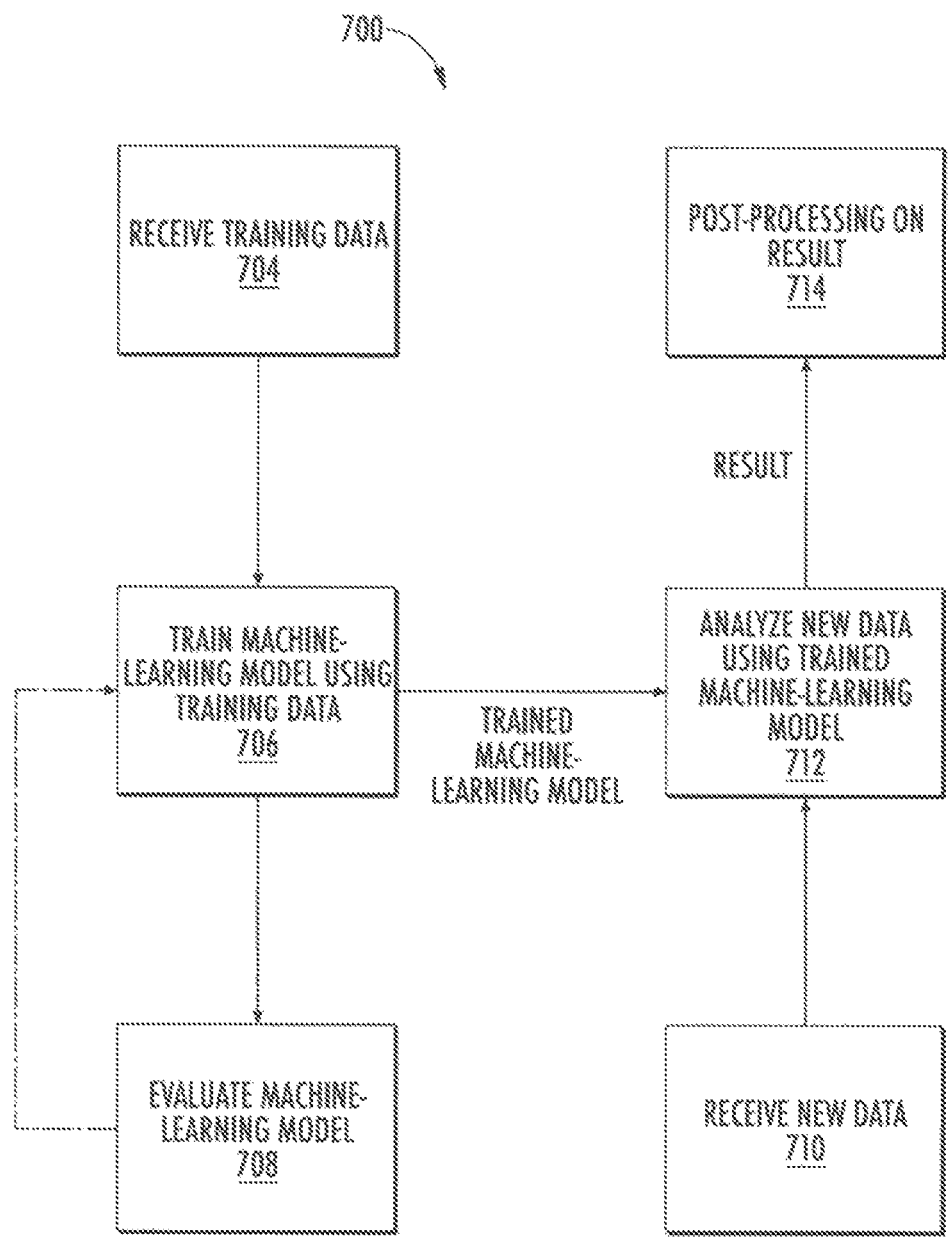
FIG. 7 is a flow diagram illustrating exemplary steps that may be performed to train a machine leaning model as disclosed herein.

An overview of training and use method 700 of a machine-learning model for position and trajectory identification will now be described below with respect to the flow chart of FIG. 7. In block 704, training data may be received. In some examples, the training data may be received from a remote database or a local database, constructed from various subsets of data, or input by a user. The training data may be used in its raw form for training a machine-learning model or pre-processed into another form, which can then be used for training the machine-learning model. For example, the raw form of the training data may be smoothed, truncated, aggregated, clustered, or otherwise manipulated into another form, which can then be used for training the machine-learning model. In embodiments, the training data may include communication exchange information, historical communication exchange information, and/or information relating to the communication exchange. The communication exchange information may be for a general population and/or specific to a user and user account in a financial institutional database system. For example, for position alignment, training data may include processing image data comprising contactless cards in different orientations and from different perspectives to learn the voxel values of features of the card at those orientations and perspectives. For trajectory adjustment and prompt identification, such training data may include data relating to the impact of trajectory adjustments to the card when at different locations. The machine learning model may be trained to identify prompts by measuring the effectiveness of prompts at achieving the trajectory adjustment, wherein the effectiveness may be measured in one embodiment by time to card alignment.

In block 706, a machine-learning model may be trained using the training data. The machine-learning model may be trained in a supervised, unsupervised, or semi-supervised manner. In supervised training, each input in the training data may be correlated to a desired output. The desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 708, the machine-learning model may be evaluated. For example, an evaluation dataset may be obtained, for example, via user input or from a database. The evaluation dataset can include inputs correlated to desired outputs. The inputs may be provided to the machine-learning model and the outputs from the machine-learning model may be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current communication exchange information, the machine-learning model may have a high degree of accuracy. Otherwise, the machine-learning model may have a low degree of accuracy. The 90% number may be an example only. A realistic and desirable accuracy percentage may be dependent on the problem and the data.

In some examples, if the machine-learning model has an inadequate degree of accuracy for a particular task, the process can return to block 706, where the machine-learning model may be further trained using additional training data or otherwise modified to improve accuracy. If the machine-learning model has an adequate degree of accuracy for the particular task, the process can continue to block 710.

At this point in time, the machine learning model(s) have been trained using a training data set to: process the captured images to determine a position and trajectory, predict a projected position of the card relative to the device based on the current position and trajectory, identify at least one trajectory adjustment and one or more prompts to achieve the trajectory adjustment.

In block 710, new data is received. For example, new data may be received during position alignment for each contactless card communication exchange. In block 712, the trained machine-learning model may be used to analyze the new data and provide a result. For example, the new data may be provided as input to the trained machine-learning model. As new data is received, the results of feature extraction prediction, position and trajectory prediction may be continually tuned to minimize a duration of the alignment process.

In block 714, the result may be post-processed. For example, the result may be added to, multiplied with, or otherwise combined with other data as part of a job. As another example, the result may be transformed from a first format, such as a time series format, into another format, such as a count series format. Any number and combination of operations may be performed on the result during post-processing.

Simultaneous Localization and Mapping (SLAM) has become well-defined in the robotics community for on the fly reconstruction of 3D image space. For example, "MonoSLAM: Real-Time Single Camera SLAM" by Davidson et. al, IEEE Transactions on Pattern Analysis and Machine Intelligence, Vol. 29, No. 6, 2007 (incorporated herein by reference), focuses on localization and presents a real-time algorithm which can recover the 3D trajectory of a monocular camera, moving rapidly through a previously unknown scene. According to one aspect it is realized that the techniques described by Davidson for camera tracking may be leveraged for use in the position alignment system and method disclosed herein. Rather than track the advancement of the card to the phone, as described above, SLAM techniques may be used to track the advancement of the camera of the phone to the detected features of the card to achieve a similar result of positioning the card relative to the phone.

Figure 8:
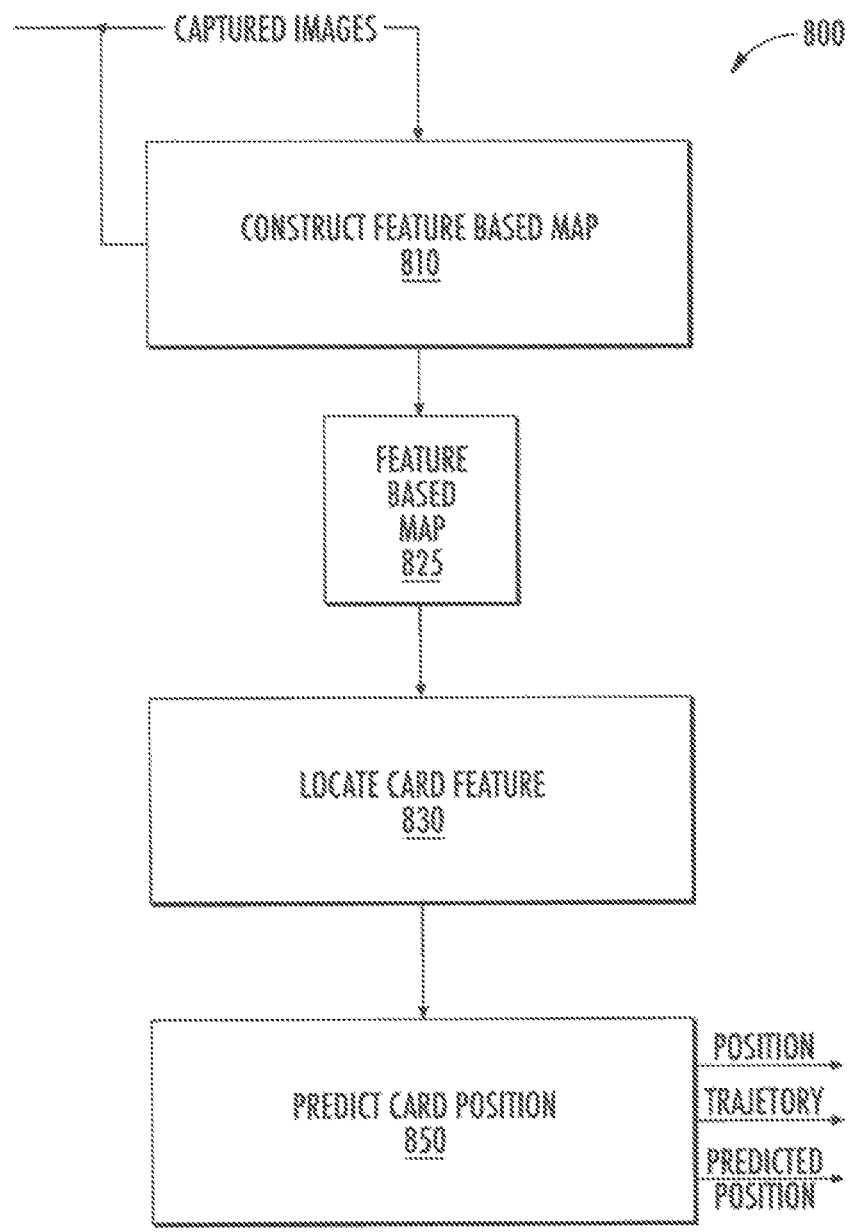
FIG. 8 is a flow diagram illustrating exemplary steps that may be performed in a Simultaneous Localization and Mapping (SLAM) process that may be used as disclosed herein.

Referring now to FIG. 8, a flow diagram illustrating exemplary steps of a MonoSLAM method 800 for contactless card localization, that may be used to perform the functions of steps 615 and 620 of FIG. 6 will now be described. The technique disclosed by Davidson, constructs a persistent map of scene landmarks to be referenced indefinitely in a state-based framework. Forming a persistent map may be advantageous when camera motion is restricted, and thus SLAM techniques may be beneficial to position alignment processes focused on a particular object such as a contactless card. Use of the persistent map enables the processing requirement of the algorithm to be bounded and continuous real-time operation may be maintained.

SLAM allows for on the-fly probabilistic estimation of the state of the moving camera and its map to limit predictive searches using the running estimates to guide efficient processing.

At step 810, an initial probabilistic feature-based map may be generated, representing at any instant a snapshot of the current estimates of the state of the camera and all features of interest and, the uncertainty in these estimates. The map may be initialized at system start-up and persists until operation ends but may evolve continuously and dynamically as it is updated over time with new image information. The estimates of the probabilistic state of the camera and features are updated during relative camera/card motion and feature observation. When new features are observed the map may be enlarged with new states and, if necessary, features can also be deleted. However, it is appreciated that, once the features of the contactless card may be identified with a high probabilistic certainty, further image processing can limit subsequent searches to the located feature.

The probabilistic character of the map lies in the propagation over time not only of the mean "best" estimates of the states of the camera/card but a first order uncertainty distribution describing the size of possible deviations from these values. Mathematically, the map may be represented by a state vector and covariance matrix P. State vector x^ may be composed of the stacked state estimates of the camera and features and P may be a square matrix of equal dimension which may be partitioned into submatrix elements as shown in Equation I below:

$$\hat{x} = \begin{pmatrix} \hat{x}_v \\ \hat{y}_1 \\ \hat{y}_2 \\ \vdots \end{pmatrix}, P = \begin{bmatrix} P_{xx} & P_{xy_1} & P_{xy_2} & \cdots \\ P_{y_1x} & P_{y_1y_1} & P_{y_1y_2} & \cdots \\ P_{y_2x} & P_{y_2y_1} & P_{y_2y_2} & \cdots \\ \vdots & \vdots & \vdots & \end{bmatrix}. \quad \text{Equation I}$$

The resulting probability distribution over all map parameters may be approximated as a single multivariate Gaussian distribution in a space of dimension equal to the total state vector size. Explicitly, the camera's state vector xv comprises a metric 3D position vector $r^W$, orientation quaternion $q^{RW}$, velocity vector $v^W$, and angular velocity vector $\omega^R$ relative to a fixed world frame W and "robot" frame R carried by the camera (13 parameters) as shown in Equation II below:

$$x_v = \begin{pmatrix} r^W \\ q^{WR} \\ v^W \\ \omega^R \end{pmatrix}. \qquad \text{Equation II}$$

Where feature states $y_i$ are the 3D position vectors of the locations of point features; according to one aspect, the point features may include features of the contactless card. The role of the map 825 permits real-time localization capturing a sparse set of high-quality landmarks. Specifically, each landmark may be assumed to correspond to a well-localized point feature in 3D space. The camera may be modeled as a rigid body needing translation and rotation parameters to describe its position, and we also maintain estimates of its linear and angular velocity. According to one aspect, the camera modeling herein may be translated relative to the extracted feature (i.e., the contactless card) to define the translational and rotational parameters of card movement to maintain linear and angular card velocity relative to the phone.

In one embodiment, Davison employs relative larger (11×11 pixel) image patches to serve as long-term landmark features at step 830. Camera localization information may be used to improve matching over camera displacements and rotations. Salient image regions may be originally detected automatically (i.e., based on card attributes) using, for example, techniques described in J. Shi and C. Tomasi, "Good Features to Track," Proc. IEEE Conf. Computer Vision and Pattern Recognition, pp. 593-600, 1994 (incorporated herein by reference) which provides for repeatable visual landmark detection. Once the 3D location, including depth, of a feature, has been fully initialized, each feature may be stored as an oriented planar texture. When making measurements of a feature from new (relative) camera positions, its patch may be projected from 3D to the image plane to produce a template for matching with the real image. Saved feature templates are preserved over time to enable remeasurement of the locations of features over arbitrarily long time periods to determine feature trajectory.

According to one embodiment, a constant velocity, constant angular velocity model may be used that assumes that the camera moves at a constant velocity over all time with undetermined accelerations occurring within a Gaussian profile. Although this model imparts a certain smoothness to the relative card/camera motion, it imparts robustness to systems using sparse visual measurements. In one embodiment, a predicted position of an image feature (i.e., a predicted card location) may be determined before searching for the feature within the SLAM map.

One aspect of Davison's approach involves predicting feature position at 850 and limiting image review to the predicted feature position. Feature matching between image frames itself may be carried out using a straightforward normalized cross-correlation search for the template patch projected into the current camera estimate; the template may be scanned over the image and tested for a match, starting at a predicted location, until a peak is found. Sensible confidence bound assumptions focus image processing efforts, enabling image processing to be performed in real-time, at high frame-rates by limiting searching to tiny search regions of incoming images using the sparse map.

In one embodiment, predicting position may be performed as follows. First, using the estimates $x_v$ of camera position and $y_i$ of feature position, the position of a point feature relative to the camera is expected to be as shown in Equation III below:

$$h_L{}^R = R^{Rw}(y_i{}^W - r^W). \qquad \text{Equation III:}$$

With a perspective camera, the position (u,v) at which the feature would be expected to be found in the image is found using the standard pinhole model shown in Equation IV below:

$$h_i = \begin{pmatrix} u \\ v \end{pmatrix} = \begin{pmatrix} u_0 = fk_u \frac{h_{Lx}^R}{h_{Lz}^R} \\ v_0 = fk_v \frac{h_{Lx}^R}{h_{Lz}^R} \end{pmatrix}.$$

Where $fk_u$, $fk_v$, $u_0$ and $v_0$ comprise standard camera calibration parameters. This method enables active control of the viewing direction toward profitable measurements having high innovation covariance, enabling limitation the maximum number of feature searches per frame to the 10 or 12 most informative.

According to one aspect, it is thus appreciated that performance benefits associated with SLAM, including the ability to perform real-time localization of the contactless card while limiting extraneous image processing, would be advantageous to a position alignment system disclosed herein.

Referring back to FIG. 6, once position and trajectory information may be obtained via either a machine learning model, SLAM technique or other method, according to one aspect the position alignment system and method include a process 625 for predicting a trajectory adjustment and associated prompt to guide the card to a target position within the target volume. According to one aspect, the prediction may be performed using a predictive model, such as a machine learning model trained and maintained using machine learning principles described above, to identify trajectory adjustments and prompts based on the effectiveness of previous trajectory adjustments and prompts, and thereby be customized by user behavior. The trajectory adjustments may be determined, for example, by identifying a variance between a target position and a predicted position and selecting the adjustment to the current trajectory to minimize the variance. Effectiveness may be measured in a variety of manners, including but not limited to the duration of the position alignment process. For example, in some embodiments, artificial intelligence, neural networks or other aspects of a machine-learning model may self-select those prompts most effective for assisting the user to achieve the end result of card alignment.

In some embodiments, it is envisioned that trajectory adjustments may be linked to a set of one or more prompts configured to achieve the associated trajectory adjustment. The set of one or more prompts may include audible and visual prompts and may be in the form of one or more of instructions (in text or symbol form), images, including one or more of the captured images, colors, color patterns, sounds and other mechanisms that are displayed by the device. In some embodiments, an effectiveness value may be stored for each prompt, where the effectiveness value relates to the historic reaction and effect of display of such prompt to achieve the trajectory adjustment. The effectiveness value may be used by the machine-learning model to select one or more of a trajectory adjustment and/or prompt to guide the card to the target location.

At step 630, the prompts may be displayed on the display of the phone. At step 635, the process continues capturing image information, determining positions and trajectories, identifying trajectory adjustments and displaying prompts until at step 635 it may be determined that the variances between the target position and the predicted position are within a predetermined threshold. The predetermined threshold is a matter of design choice and may vary in accordance with one or more of the target volume, the NFC antennas, etc.

Once it is determined at step 635 that the variance is within a threshold, the card may be considered aligned, and at step 630 the NFC mobile device may be triggered at step 640 to initiate a communication exchange with the card.

According to one aspect, the data exchange may be a cryptogram data exchange as described in the '119 Application. During a cryptogram exchange, after communication has been established between the phone and the contactless card, the contactless card may generate a message authentication code (MAC) cryptogram in accordance with the NFC Data Exchange Format. In particular, this may occur upon a read, such as an NFC read, of a near field data exchange (NDEF) tag, which may be created in accordance with the NFC Data Exchange Format. For example an application being executed by the device 100 (FIG. 1A) may transmit a message to the contactless card 150 (FIG. 1A), such as an applet select message, with the applet ID of an NDEF producing applet, where the applet may be an applet stored in a memory of the contactless card and operable when executed upon by processing components of the contactless card to produce the NDEF tag. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card may be updated or incremented, which may be followed by "Read NDEF file."

At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application may be configured to transmit a request to contactless card, the request comprising an instruction to generate a MAC cryptogram, and the contactless card sends the MAC cryptogram to the application.

In some examples, the transmission of the MAC cryptogram occurs via NFC, however, the present disclosure is not limited thereto. In other examples, this communication may occur via Bluetooth, Wi-Fi, or other means of wireless data communication.

In some examples, the MAC cryptogram may function as a digital signature for purposes of verification. For example, in one embodiment the MAC cryptogram may be generated by devices configured to implement key diversification using counter values. In such systems, a transmitting device and receiving device may be provisioned with the same master symmetric key. In some examples, the symmetric key may comprise the shared secret symmetric key which may be kept secret from all parties other than the transmitting device and the receiving device involved in exchanging the secure data. It is further understood that both the transmitting device and receiving device may be provided with the same master symmetric key, and further that part of the data exchanged between the transmitting device and receiving device comprises at least a portion of data which may be referred to as the counter value. The counter value may comprise a number that changes each time data is exchanged between the transmitting device and the receiving device. In addition, the transmitting device and receiving device may use an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC.

In some embodiments, the transmitting device may take the selected cryptographic algorithm, and using the master symmetric key, process the counter value. For example, the sender may select a symmetric encryption algorithm, and use a counter which updates with every conversation between the transmitting device and the receiving device. The transmitting device may then encrypt the counter value with the selected symmetric encryption algorithm using the master symmetric key, creating a diversified symmetric key. The diversified symmetric key may be used to process the sensitive data before transmitting the result to the receiving device. The transmitting device may then transmit the protected encrypted data, along with the counter value, to the receiving device for processing.

The receiving device may first take the counter value and then perform the same symmetric encryption using the counter value as input to the encryption, and the master symmetric key as the key for the encryption. The output of the encryption may be the same diversified symmetric key value that was created by the sender. The receiving device may then take the protected encrypted data and using a symmetric decryption algorithm along with the diversified symmetric key, decrypt the protected encrypted data to reveal the original sensitive data. The next time sensitive data needs to be sent from the sender to the recipient via respective transmitting device and receiving device, a different counter value may be selected producing a different diversified symmetric key. By processing the counter value with the master symmetric key and same symmetric cryptographic algorithm, both the transmitting device and receiving device may independently produce the same diversified symmetric key. This diversified symmetric key, not the master symmetric key, may be used to protect the sensitive data.

In some examples, the key diversification value may comprise the counter value. Other non-limiting examples of the key diversification value include: a random nonce generated each time a new diversified key is needed, the random nonce sent from the transmitting device to the receiving device; the full value of a counter value sent from the transmitting device and the receiving device; a portion of a counter value sent from the transmitting device and the receiving device; a counter independently maintained by the transmitting device and the receiving device but not sent between the two devices; a one-time-passcode exchanged between the transmitting device and the receiving device; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

Figure 9:
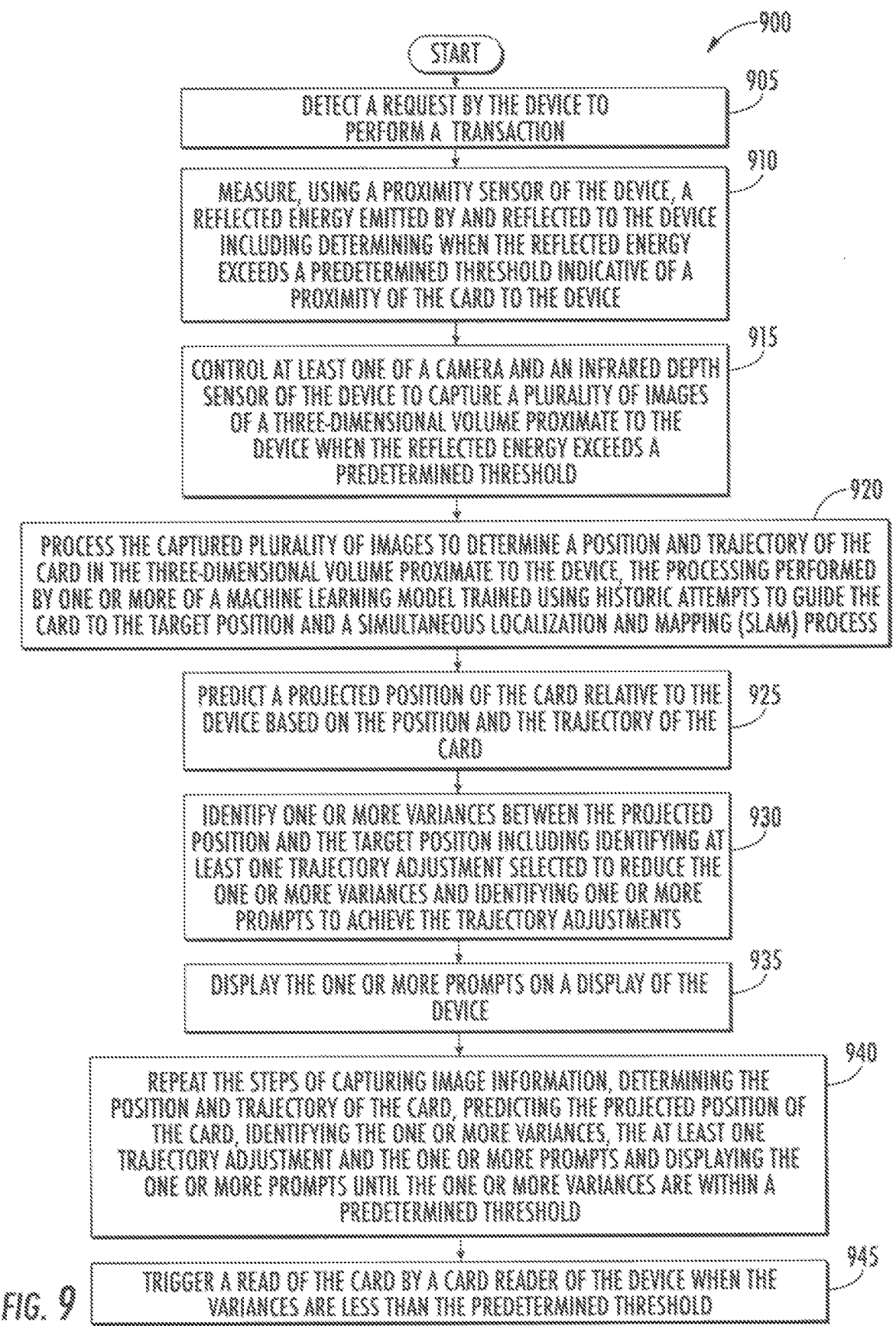
FIG. 9 is a flow diagram illustrating exemplary steps that may be performed to position a contactless card for NFC communication using a combination of proximity sensors and image capture devices of a mobile phone device.

FIG. 9 is a flow diagram 900 that illustrates the use of the position alignment system disclosed herein to align a contactless card with an NFC mobile device equipped with a proximity sensor and imaging hardware and software. At step 905 the position alignment logic detects a request by the device to perform a communication exchange. At step 910 the position alignment logic measures, they are using a proximity sensor of the device, a reflected energy emitted by and reflected to the device including determining when the reflected energy exceeds a predetermined threshold indicative of a proximity of the card to the device.

Figure 10:
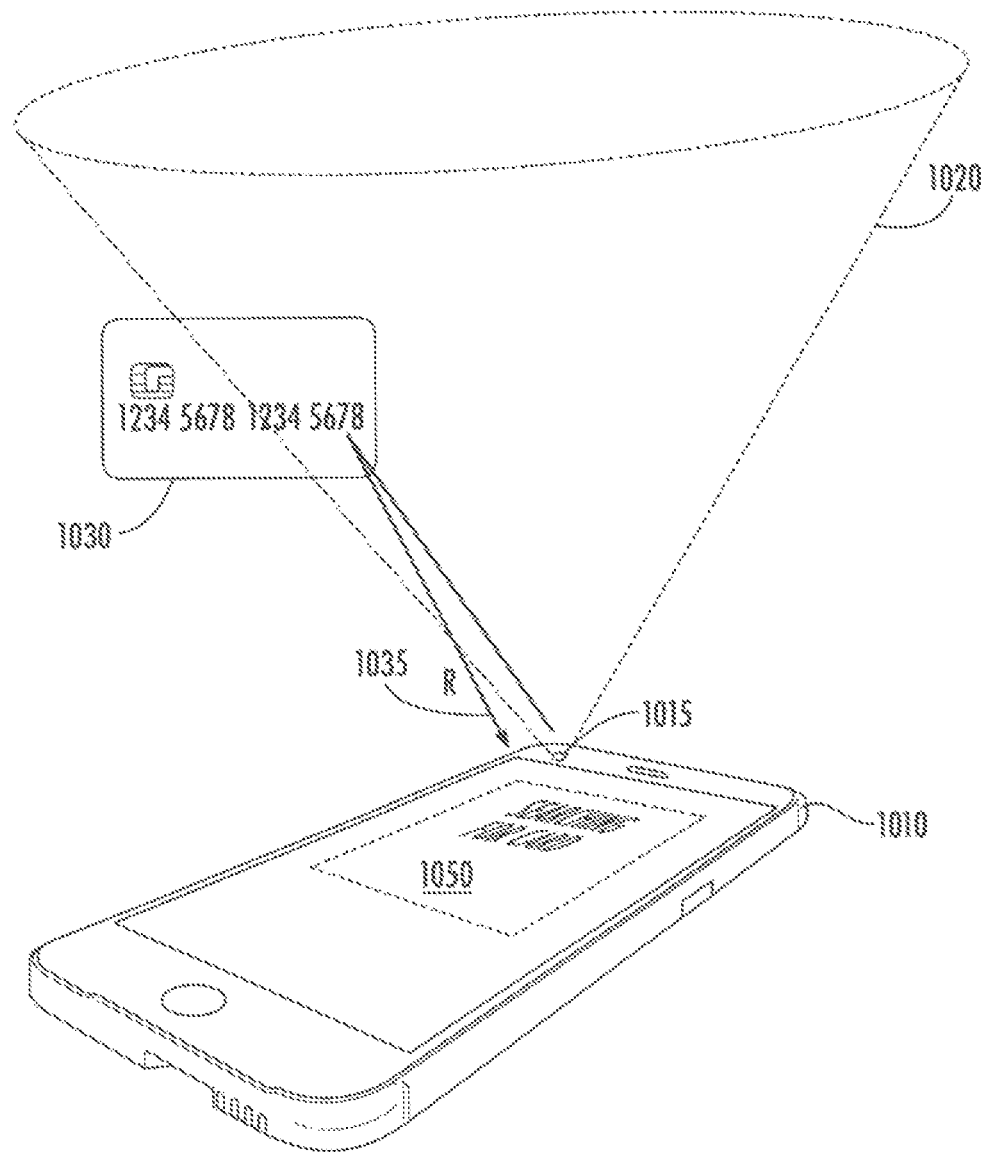
FIG. 10 illustrates an exemplary phone/card interaction and display during proximity sensing.

FIG. 10 illustrates a contactless card 1030 approaching an operating volume 1020 of a proximity sensor 1015 of a phone 1010. As the phone enters the operating volume 1020, in one embodiment an infrared beam emitted by the proximity sensor 1015 reflects back to the proximity sensor 1015 as signal R 1035. As the card moves closer to the operating volume of the phone, the reflected signal strength increases until a triggering threshold is reached, at which point the proximity sensor indicates that the card is 'NEAR'. In some embodiments, during the proximity search a display 1050 of the phone may prompt the user, for example by providing notice that it is searching for the card as shown in FIG. 10, by providing visual or audible instruction, or the like.

At step 915 (FIG. 9), when the proximity sensor is triggered, the position alignment logic controls at least one of a camera and an infrared depth sensor of the device to capture a series of images of a three-dimensional volume proximate to the device when the reflected energy exceeds a predetermined threshold. Depending upon the location of the NFC reader and the location of the cameras on the phone, it may be appreciated that cameras may be selected for image capture which comprise an operating volume that overlaps at least a portion of an operating volume of the NFC interface of the phone.

At step 920 the position alignment logic processes the captured plurality of images to determine a position and trajectory of the card in the three-dimensional volume proximate to the device. As described previously, the processing may be performed by one or both of a machine learning model trained using historic attempts to guide the card to the goal position and a Simultaneous Localization and Mapping (SLAM) process. At step 925 the position alignment process predicts a projected position of the card relative to the device based on the position and the trajectory of the card and at step 930 identifies one or more variances between the projected position and the target position including identifying at least one trajectory adjustment selected to reduce the one or more variances and identifying one or more prompts to achieve the trajectory adjustments and, at step 935 the position alignment process displays the one or more prompts on a display of the device.

Figure 11:
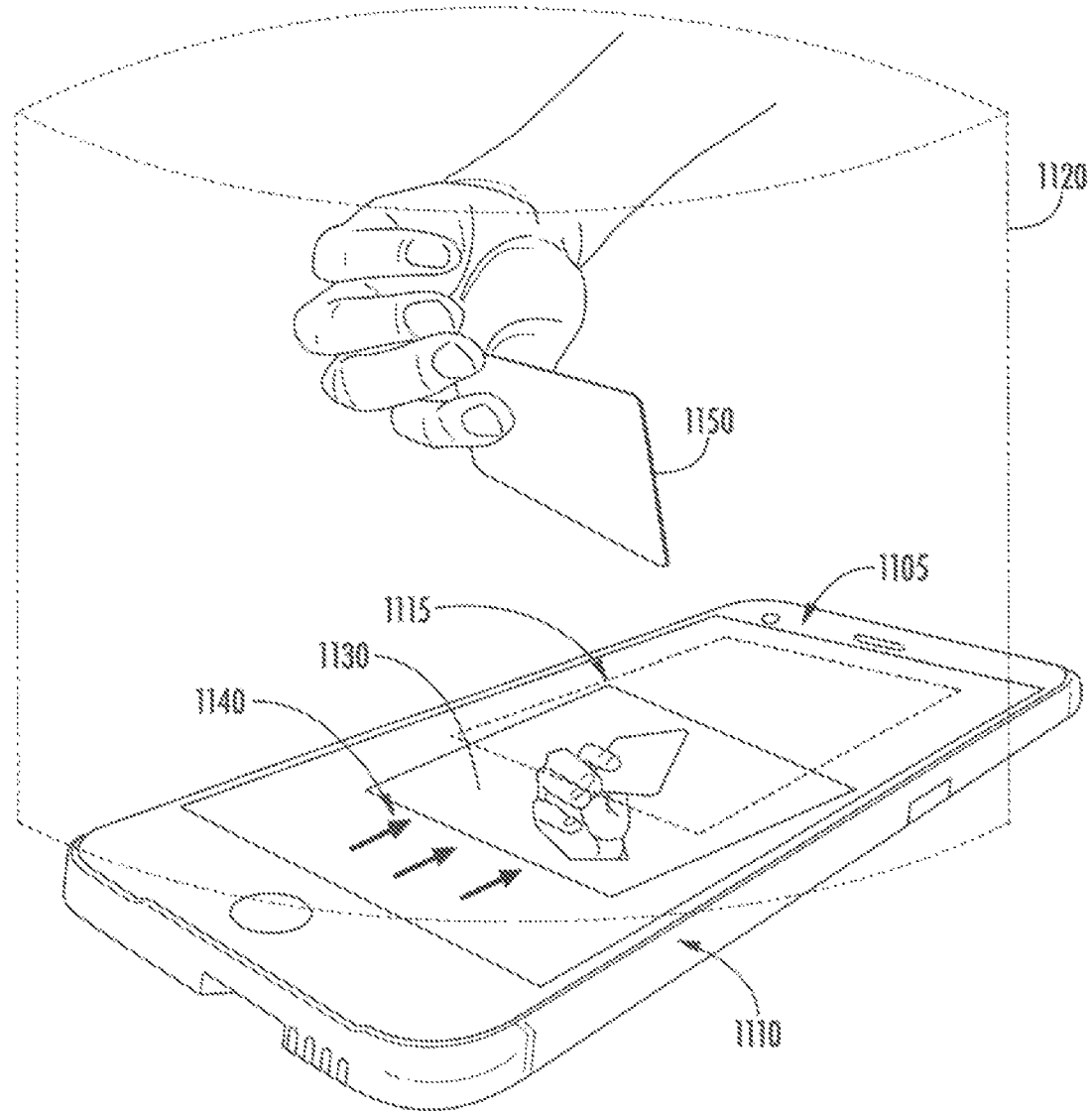
FIG. 11 illustrates an exemplary phone/card interaction and display during position alignment.

FIG. 11 illustrates an exemplary display 1105 of a phone 1110 that captures image information related to a card 1150 within a target volume 1120. The display 1105 may include a number of prompts, such as position prompt 1115 associated with a target position, image prompt 1130 and arrow prompts 1140 that may be displayed to a user to assist guidance of the card 1150 to the target position. The image prompt 1130 may include, for example, a portion of the images captured by the imaging components of the phone 1110 during position alignment and may be beneficial to a user to assist the user's understanding of their movements relative to the target. The arrows 1140 may provide directional assistance, for example as shown in FIG. 11 motioning the user to adjust the card upward for proper alignment. Other types of prompts may also be used, including but not limited to textual instructions, symbols and/or emojis, audible instructions, color based guidance (i.e., displaying a first color (such as red) to the user when the card is relatively far from the target, and transitioning the screen to green as the card becomes aligned).

At step 940 (FIG. 9) the position alignment process may repeat the steps of capturing image information, determining the position and trajectory of the card, predicting the projected position of the card, identifying the one or more variances, the at least one trajectory adjustment and the one or more prompts and displaying the one or more prompts until the one or more variances are within a predetermined threshold. At step 945, the position alignment process may trigger a read of the card by a card reader of the device when the variances are less than the predetermined threshold. In some embodiments, the position alignment process may continue to operate during the data exchange between the card and the mobile device, for example to provide prompts that adjust the position of the card should it move during the read.

Figure 12C:
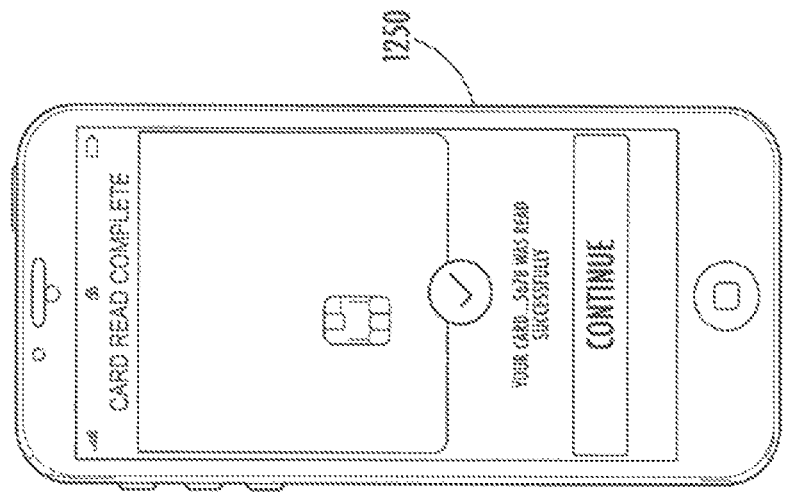
FIGS. 12A-12C illustrate exemplary mobile phone displays that may be provided following successful alignment for NFC communication, including prompts for adjusting contactless card positioning to maximize received signal strength by the mobile device.
Figure 12B:
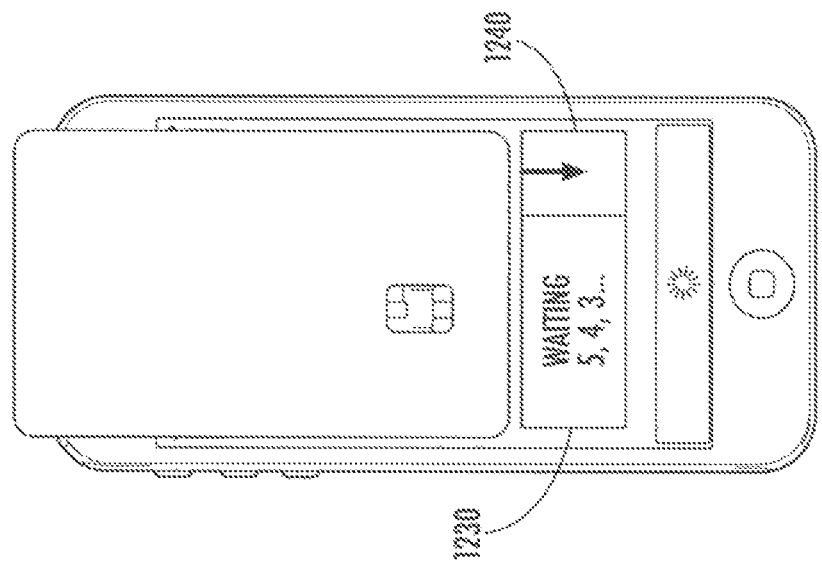
Figure 12A:
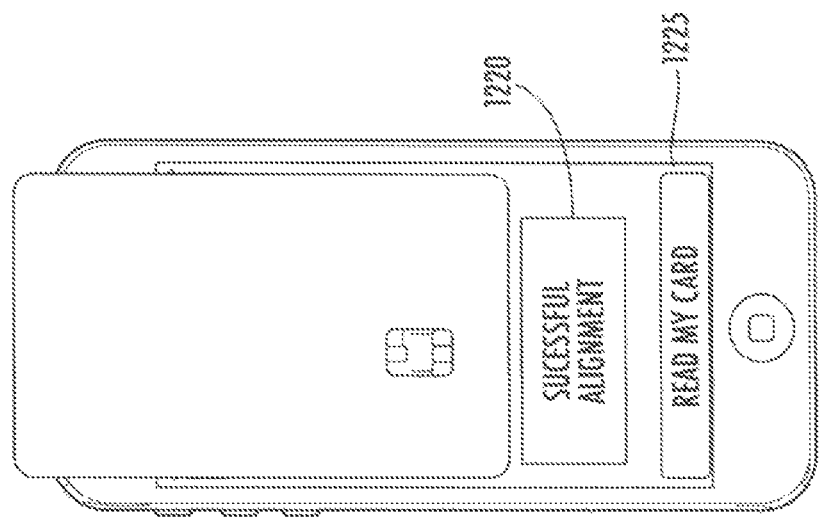

FIGS. 12A, 12B and 12C are examples of display prompts that may be provided by the position alignment process once alignment is detected. In FIG. 12A, prompt 1220 may be provided to notify a user when the card is aligned with the target position. In some embodiments, the interface may provide a link such as link 1225 to enable a user to initiate a card read by the phone. In other embodiments, alignment may automatically trigger the card read.

In FIG. 12B, during the card read process, a prompt may be provided to the user, for example a countdown prompt 1230. In addition, additional prompts, for example such as arrow 1240, may be provided to enable a user to correct any movement that may have occurred to the card during the read, to ensure that connectivity is not lost and to improve the rate of success of the NFC communication. Following the read, as shown in FIG. 12C, the display provides a notification 1250 to the user regarding the success or failure of the communication exchange Accordingly, a position alignment system and method has been shown and described that facilitates positioning of a contactless card in a preferred location in a target volume relative to a contactless card reading device. Alignment logic uses information captured from available imaging devices such as infrared proximity detectors, cameras, infrared sensors, dot projectors, and the like to guide the card to a target location. The captured image information may be processed to identify a card position, trajectory and predicted location using one or both of a machine learning model and/or a Simultaneous Localization and Mapping logic. Trajectory adjustment and prompt identification may be intelligently controlled and customized using machine-learning techniques to customize guidance based on the preference and/or historical behavior of the user. As a result, the speed and accuracy of contactless card alignment is improved and received NFC signal strength is maximized, thereby reducing the occurrence of dropped transactions.

The above techniques have discussed various methods for guiding placement of the contactless card to a desired position relative to a card reader interface of the device, once proximity of the card is initially detected using a proximity sensor. However, it is appreciated that the principles disclosed herein may be expanded to augment, or replace altogether, proximity sensor information using captured image data to detect card proximity. The captured image information may further be processed to determine when the card is in a particular position relative to the card reader interface, and to automatically perform an operation associated with a user interface element, e.g., automatically triggering an NFC read operation or other function by the mobile device without waiting for user input. Such an arrangement enables automatic triggering of capabilities without requiring user input, to control the operations, for example bypassing the need for human interaction with user interface elements of the device.

According to one aspect, the image processing logic 415 (FIG. 4) may be augmented to include program code for determining an image parameter that may be suggestive of a proximity of a card to the card reader. For example, the image parameter may relate to a proximity feature of the image, i.e., a feature that indicates that an object may be proximate to the camera. In some embodiments, the card reader may be positioned on the same surface as the camera of the device that is used to capture the image, and thus the image information may be further indicative of a proximity of the card to the card reader. In various embodiments, the card reader/camera may be positioned on a front face, or rear face of the device.

In some embodiments, the image parameter comprises one or more of a darkness level and/or a complexity level of the image. For example, referring now briefly to FIGS. 13A and 13B, a device 1310 may be a device having a contactless card reading interface configured as described above to retrieve a MAC cryptogram from the contactless card 1320, for example when the card 1320 is brought proximate to device 1310. For example, the device may send an applet select message, with the applet ID of an NDEF producing applet, where the applet may be an applet stored in a memory of the contactless card and operable when executed upon by processing components of the contactless card to produce the NDEF tag. According to one aspect, a series of images may be captured using a camera of the device, and the darkness levels and/or complexity levels may be analyzed to determine when the card may be a preferred distance from the device to automatically trigger the forwarding of the NFC read operation from the NDEF producing applet of the contactless card.

Figure 13A:
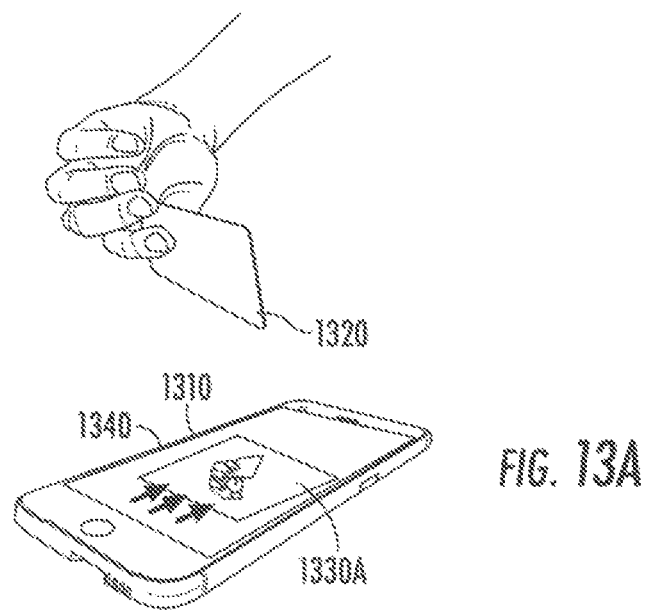
FIGS. 13A, 13B and 13C illustrate an exemplary phone/card interaction as disclosed herein.
Figure 13B:
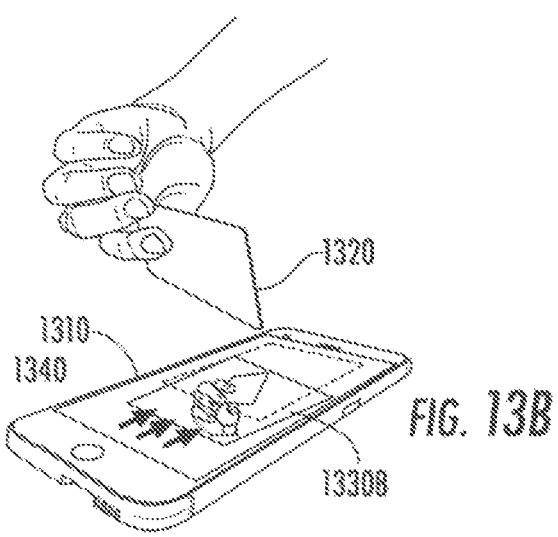

In FIGS. 13A and 13B, for purposes of explanation only, an image 1320 is shown on the display 1340 of the device 1310, although it is not necessary that captured images that are used as disclosed herein to determine card proximity be displayed on device 1310.

According to one embodiment, when the device initiates an NFC communication, (for example, by a user selecting an NFC read operation (such as button 1225) on a user interface on the device, or by the device receiving a request for the device to initiate an NFC communication with the card, for example from a third party (such as a merchant application or mobile communication device), etc.) the device may capture a series images of the spatial volume proximate to the device. The series of images may be processed to identify one or more image parameters of one or more of the images in the series, including but not limited to a darkness level or a complexity level of the image. The complexity level and/or darkness level may be used to trigger the NFC read. Alternatively, or in conjunction, image processing may include identifying trends and/or patterns in the darkness and/or complexity levels of series of images or portions of the series of images that suggest advancement of the card. The identification of the trend and/or the pattern within the series of images that indicate that the card may be preferred distance relative to the device may be used to automatically trigger the NFC read.

Figure 13C:
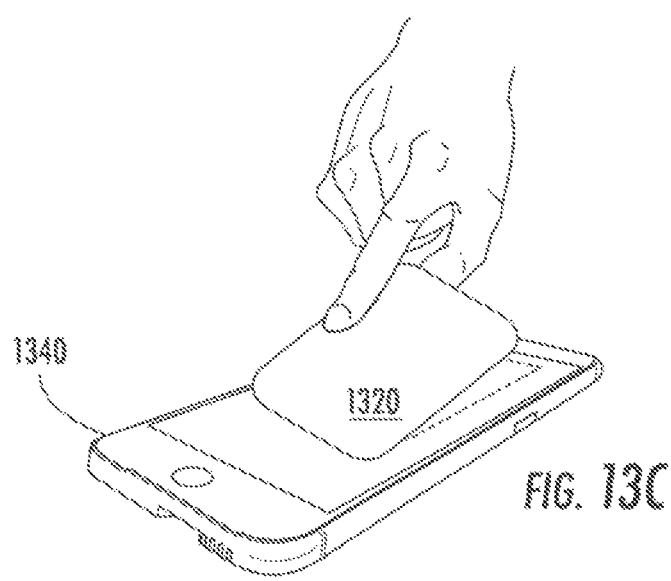

For example, as shown in FIGS. 13A-13C, when the card is further away from the device, the captured image (here represented as image 1330A) may be relatively lighter than the image 1330B, captured relatively later in time as the card 1320 approaches the device. As shown in FIG. 13B, as the card moves closer, the image becomes darker until, as shown in FIG. 13C, the captured image (not visible in FIG. 13C) includes is dark, light is blocked from appearing in the images by the card 1320. This may be because as the card approaches the device, the card (or a hand) may block the ambient light received by the camera.

As mentioned, card presence at a preferred distance from the device may be determined in response to the darkness level, darkness level trend, complexity level and/or complexity level trend in the captured series of images. In particular, card presence may be determined by processing pixel values of the series of images to identify a darkness level of each processed pixel. For example, assigning a gray scale value to the pixel. The darkness level for the image may be determined by averaging the darkness levels of the image pixels. In some embodiments, the darkness levels may be compared against a threshold corresponding to a darkness level when a card is a preferred distance from the device, for example such distance supports a successful NFC read operation. In some embodiments, the threshold may be an absolute threshold; for example, in a system where '0' indicates white, and '1' indicates dark, the card may be considered 'present', and the card reader may be enabled, when the darkness level is equal to 0.8 or more. In other embodiments, the threshold may be a relative threshold that takes into consideration the ambient light of the environment in which the communication exchange is to occur. In such embodiments, the first image captured may provide a baseline darkness level, and the threshold may relate to an amount over the threshold to trigger the NFC communication; e.g. the threshold may be a relative threshold. For example, in a darkened room with an initial darkness level of 0.8 it may be desirable to delay triggering NFC communication until the darkness level is equal to 0.95 or more.

In addition to triggering the NFC communication based on an individually calculated darkness level, the system further contemplates recognizing trends or patterns in image darkness levels to trigger the NFC read. Recognizing trends may include, for example, determining an average value across a set of images and triggering read when the average value across the set of images satisfies the threshold. For example, while an individual image may exceed a threshold, the position of the card may not be stable enough to perform an NFC read, and thus it may be desirable to dictate that a predetermined number of successively captured images exceed the darkness threshold prior to triggering a read. In addition, or alternatively, successively processed images may be monitored to identify spikes and/or plateaus, i.e., sudden shifts in darkness levels that are maintained between successive images that indicate activity at the card reader.

In some embodiments, the darkness level for the entire image may be determined by averaging at least a subset of the calculated pixel darkness values. In some embodiments, certain darkness values may be weighted to increase their relevancy to the darkness level calculation; for example, those portions of the image that are known to be proximate to the card reader or which are closer to a recognized feature may be more highly weighted than those that are farther away from the card reader.

As described above, a complexity level may be calculated for each captured image, where the complexity level relates generally to the frequency distribution of pixel values within the captured image. In one embodiment, the complexity value may be determined on a pixel by pixel basis, by comparing a pixel value of each pixel to the pixel value of one or more adjacent pixels. As a card gets closer to the device, as shown in FIG. 13B, if the card is properly positioned the background image may be obscured by the card. The image by default becomes more uniform as the card covers the image, and neighboring pixels generally comprise the same pixel value. In various embodiments complexity may be determined for each pixel in the image, or for a subset of pixels at previously identified locations within the image. Complexity for each pixel may be determined by examination of neighboring pixel values. A complexity level for the entire image may be determined by averaging at least a subset of the calculated pixel complexity values. In some embodiments, certain complexity levels may be weighted to increase their relevancy to the complexity calculation; for example, those portions of the image that are known to be proximate to the card reader or to an identified feature may be more highly weighted than those that are farther away from the card reader or the identified feature.

In other embodiments, machine learning methods such as those disclosed herein may augment the image processing, for example by recognizing patterns in pixel darkness/pixel complexity values in successive images indicative of a known card activity proximate to the card reader. Such patterns may include, for example, pixel darkness/complexity levels that change in a known way, (i.e., getting darker from the top down or bottom up). The patterns may also include image elements (such as stripes, icons, printing, etc.) that assist in card recognition, and may be used as described above to provide prompts for proper placement for the particularly recognized card. Over time, information related to successful and unsuccessful card reads may be used to determine the appropriate image pattern that establishes a card presence for a successful NFC card communication exchange.

Figure 14:
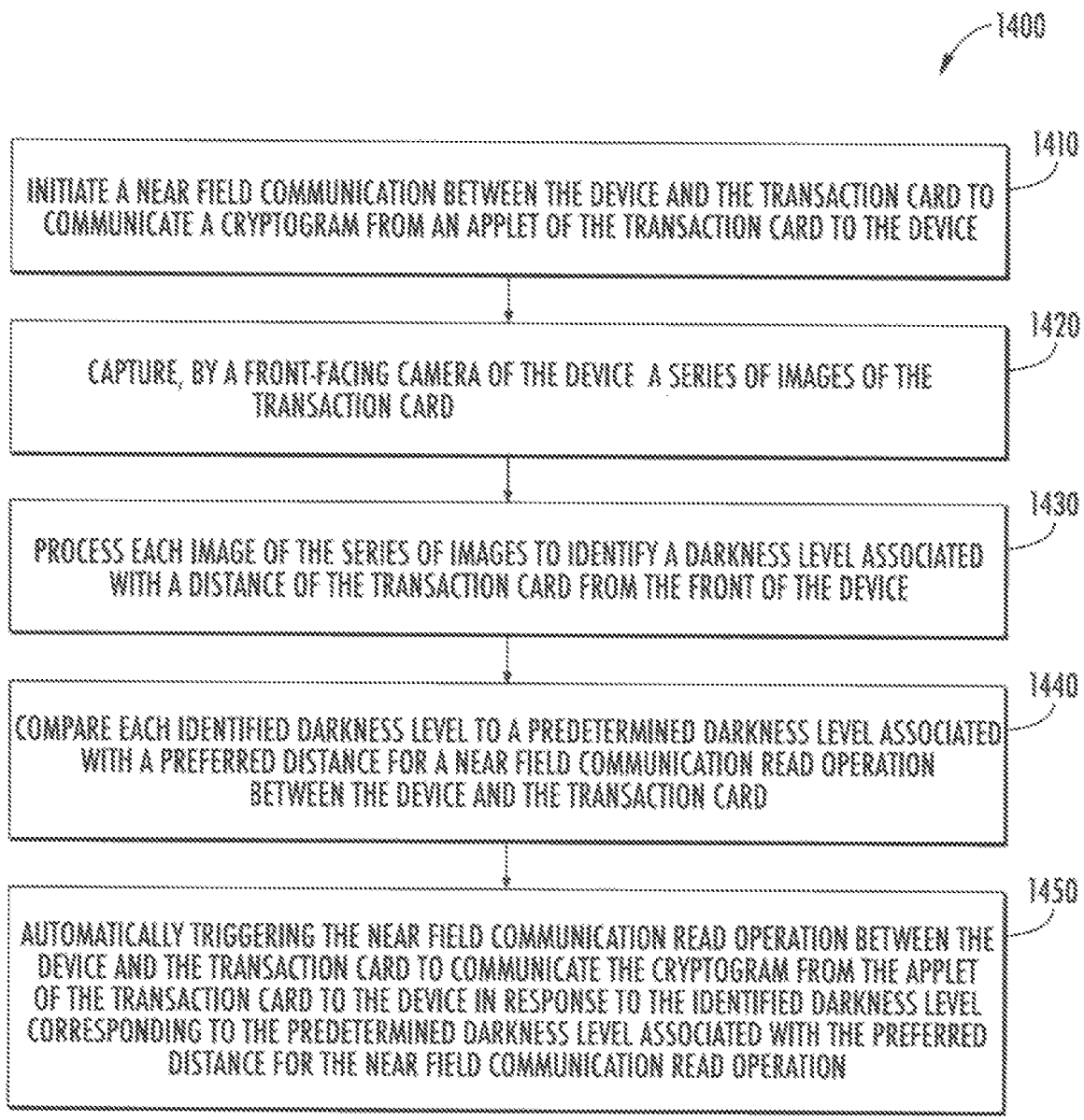
FIG. 14 is a flow diagram of one embodiment of an exemplary process for controlling an interface of a card reader of a device using captured image data as disclosed herein.

FIG. 14 is a flow diagram of exemplary steps that may be performed to trigger an NFC card read using one or both of the darkness and/or complexity image attributes described above. At step 1410, a near field communication may be initiated by the device. Initiation of the near field communication may occur due to selection of a user interface element on the device, such as a READ button 1225 in FIG. 12A. Alternatively, or in conjunction, initiation of the near field communication may occur as a result of an action by an application executing on the device, for example an application that leverages use of a cryptogram from the card for authentication or other purposes.

During the initiation of the NFC communication, at step 1420 a camera of the device, such as a front facing camera, may capture a series of images of the spatial volume in front of the device camera. In some embodiments, 60, 120, 240 or more images may be captured each second, although the present disclosure is not limited to the capture of any particular number of images in the series. At step 1430, the images may be processed to identify one or more image parameters, such as a darkness level representing a distance between the card and the device. At step 1440, the processed darkness levels of the images are compared to a predetermined darkness level, for example a darkness level associated with a preferred distance for near field communication operations. At step 1450, an NFC read operation may be automatically triggered, for example to communicate a cryptogram from an applet of the card, when it is determined that the darkness level corresponds to the preferred darkness level for an NFC read operation.

In some embodiments, the automatic triggering of the NFC read operation may bypass or replaces a trigger historically provided by a user interface element. For example, in some embodiments, a graphical user interface element such as a read button (1225) may be provided on a device to enable the user to activate an NFC communication when the user determines that the card may be appropriately located relative to the device. The user interface elements may be associated with a function, such as a read operation, in some embodiments. It may be appreciated that other user interface elements may be triggered using the techniques describes herein and various corresponding associated functions may be automatically triggered. Automatic triggering as disclosed herein may reduce delays and inaccuracies associated with historically controlled user interface elements, improving NFC communication flows and success rates.

Accordingly, a system and method for detecting card presence to trigger an NFC read using captured image information has been shown and described. Such a system may utilize machine learning methods and/or SLAM methods as described in more detail above to provide additional guidance, prior to the triggering the card read. With such an arrangement, the placement of cards is improved and the rate of success of NFC communication exchanges may be improved.

As used in this application, the terms "system", "component" and "unit" are intended to refer to a computer-related entity, either hardware, a combination of hardware and software, software, or software in execution, examples of which are described herein. For example, a component may be, but is not limited to being, a process running on a processor, a processor, a hard disk drive, multiple storage drives, a non-transitory computer readable medium (of either optical and/or magnetic storage medium), an object, an executable, a thread of execution, a program, and/or a computer. By way of illustration, both an application running on a server and the server may be a component. One or more components can reside within a process and/or thread of execution, and a component may be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What we claim is:

1. A method for authenticating a transaction for a device includes the steps of:
   receiving a request to authenticate the device;
   displaying, on the device, a prompt to communicatively couple a card with the device;
   detecting, by a proximity sensor of the device, that the card is proximate to the device, the card storing authentication data for the device;
   capturing, by a camera of the device, a series of images as the card approaches the device;
   processing the series of images to determine a position and a trajectory of the card as the card approaches the device;
   detecting, based on the series of images, that the card is at a target location relative to the device;
   triggering an interface of the device to request an authentication cryptogram from the card when the card is detected at the target location; and
   receiving the authentication cryptogram from the card in response to the request, the authentication cryptogram formed from authentication data stored by the card.

2. The method of claim 1 wherein the step of processing the series of images to determine the position and a trajectory of the card uses at least one of a machine learning model or a simultaneous localization and mapping (SLAM) process.

3. The method of claim 1 including enabling the proximity sensor in response to receipt of the request to authenticate the device.

4. The method of claim 2, wherein the authentication data stored by the card includes a counter value, a shared secret, a key or a combination thereof.

5. The method of claim 4 including the step of:
   forwarding the authentication cryptogram to an authentication server, the authentication server maintaining a copy of the authentication data stored by the card; and
   receiving a transaction authorization when the authentication cryptogram is validated by the authentication server using the copy of the authentication data stored by the card.

6. The method of claim 1 including the step of initiating a transaction, and where the step of receiving a request to authenticate the device is received in response to the step of initiating a transaction.

7. The method of claim 1 wherein the step of capturing the series of images is performed by one or more of a camera of the device, an infrared sensor of the device or a dot projector of the device, and wherein the series of images comprises one or both of two-dimensional image information and three-dimensional image information related to one or more of an infrared energy and a visible light energy measured at the device.

8. The method of claim 7 including the step of generating a volume map of a three-dimensional volume proximate to the device using the series of images obtained from one or more of the camera, the infrared sensor and the dot projector, the volume map comprising a pixel data for a plurality of pixel locations within the three-dimensional volume proximate to the device.

9. The method of claim 1 wherein the step of processing the series of images to determine the position and the trajectory of the card includes the step of forwarding the series of images to a feature extraction machine learning model trained to process series of images to detect one or more features of the card and to identify the position and the trajectory of the card in response to the detected one or more features.

10. The method of claim 9 including forwarding the series of images to a second machine learning model trained to predict the position and trajectory based on a historic attempt to position the card.

11. The method of claim 10 wherein the historic attempt used to train the second machine learning model is customized to a user of the device.

12. A device comprising:
a proximity sensor configured to detect whether a card is proximate to the device;
an image capture device coupled to the proximity sensor and configured to capture a series of images of a three-dimensional volume proximate to the device;
a processor coupled to the proximity sensor and the image capture device;
a display interface coupled to the processor;
a card reader interface coupled to the processor; and
a non-transitory medium storing program code configured to trigger a read of a card that stores authentication data when the card is in a target location relative to the device, the program code operable when executed upon by the processor to:
receive a request to authenticate the device;
display, on the display interface, a prompt to communicatively couple a card with the device; detect, by the proximity sensor, that the card is proximate to the device;
capture, by a camera of the device, a series of images as the card approaches the device;
processing the series of images to determine a position and a trajectory of the card as the card approaches the device;
detecting, based on the series of images, that the card is at a target location relative to the device;
triggering the card reader interface to request an authentication cryptogram from the card; and
receiving the authentication cryptogram from the card by the card reader interface when the card is detected at the target location.

13. The device off claim 12 wherein the program code that is operable when executed upon to process the series of images to determine the position and a trajectory of the card within the three-dimensional volume proximate to the device uses at least one of a machine learning model or a simultaneous localization and mapping (SLAM) process.

14. The device of claim 12 wherein the image capture device comprises one or more of a camera, an infrared sensor or a dot projector, and the series of images capture one or more of an infrared energy and a visible light energy measured at the device.

15. The device of claim 14 wherein the series of images comprise one or both of two-dimensional image information and three-dimensional image information.

16. The device of claim 12 wherein the program code comprises a feature extraction machine learning model trained to process the series of images to detect one or more features of the card and to identify the position and the trajectory of the card in response to the detected one or more features.

17. The device of claim 16 wherein the program code further comprises a predictive machine learning model that is trained to determine the position and trajectory of the card based on past uses of the card with the device.

18. The device of claim 17 wherein past uses of the card are limited to uses of the card by a specific individual.

19. The device of claim 12 wherein the prompt includes a visible prompt, an audible prompt, or a combination thereof.

20. A method for authenticating a transaction using authentication information stored by a contactless card includes the steps of:
detecting a request by a device to perform a transaction;
generating, by the device, a prompt to engage the contactless card;
enabling a proximity sensor of the device to detect a contactless card approach;
capturing a series of images by the device in response to detection of the contactless card by approach the proximity sensor;
processing the series of images to detect when the contactless card is within a target location using a predictive model trained using historic communications between the contactless card and the device; and
retrieving an authentication cryptogram from the contactless card when the series of images indicate that the contactless card is within the target location.

* * * * *